US010129511B2

(12) United States Patent
Nose

(10) Patent No.: US 10,129,511 B2
(45) Date of Patent: Nov. 13, 2018

(54) IMAGE PROCESSING APPARATUS, IMAGE PROJECTION APPARATUS, AND IMAGE PROCESSING METHOD

(71) Applicant: Masaki Nose, Kanagawa (JP)

(72) Inventor: Masaki Nose, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/654,816

(22) Filed: Jul. 20, 2017

(65) Prior Publication Data

US 2018/0035088 A1 Feb. 1, 2018

(30) Foreign Application Priority Data

Aug. 1, 2016 (JP) .................................. 2016-151602
May 31, 2017 (JP) .................................. 2017-108697

(51) Int. Cl.
*H04N 1/04* (2006.01)
*H04N 9/31* (2006.01)
(Continued)

(52) U.S. Cl.
CPC ........... *H04N 9/3164* (2013.01); *G06T 5/009* (2013.01); *G06T 5/40* (2013.01); *H04N 1/6005* (2013.01);
(Continued)

(58) Field of Classification Search
CPC .. H04N 5/2351; H04N 5/2352; H04N 5/2355; H04N 5/23216; H04N 5/23219;
(Continued)

(56) References Cited

U.S. PATENT DOCUMENTS 8,515,170 B2 8/2013 Morimoto
2005/0180629 A1 8/2005 Masuno et al.
(Continued)

FOREIGN PATENT DOCUMENTS

EP 2323373 5/2011
EP 2802139 11/2014
(Continued)

OTHER PUBLICATIONS

Jiang Duan et al : "Fast Tone Mapping for High Dynamic Range Images", Pattern Recognition, 2004. ICPR 2004. Proceedings of the 17th International Conference on Cambridge, UK Aug. 23-26, 2004, Piscataway, NJ, USA, IEEE, Los Alamitos, CA, USA, vol. 2, Aug. 23, 2004 (Aug. 23, 2004), pp. 847-850, XP010724524, DOI : 10.1109/ICPR. 2004.1334391, ISBN: 978-0-7695-2128-2 * the whole document *.

(Continued)

*Primary Examiner* — Negussie Worku
(74) *Attorney, Agent, or Firm* — IPUSA, PLLC

(57) ABSTRACT

An image processing apparatus includes an input image color space conversion unit that converts an input image signal of each frame of a moving image signal into a luminance image signal and a color difference image signal, a luminance image correction unit that adjusts a histogram equalization correction intensity of a histogram equalization process for each frame and applies the histogram equalization process to the luminance image signal of each frame to generate a luminance-corrected image signal, a color difference image correction unit that applies a saturation enhancement process to the color difference image signal of each frame, in parallel with the histogram equalization process, to generate a color-difference-corrected image signal, and an output image color space conversion unit that converts the luminance-corrected image signal and the color-difference- (Continued)

corrected image signal into an output image signal in the same format as the input image signal.

15 Claims, 20 Drawing Sheets

(51) Int. Cl.
      *H04N 5/232*     (2006.01)
      *G06T 5/00*       (2006.01)
      *G06T 5/40*       (2006.01)
      *H04N 1/60*       (2006.01)
      *H04N 9/69*       (2006.01)
      *H04N 5/225*     (2006.01)
      *H04N 5/235*     (2006.01)

(52) U.S. Cl.
      CPC ....... *H04N 1/6027* (2013.01); *H04N 5/23229* (2013.01); *H04N 9/3182* (2013.01); *H04N 9/69* (2013.01); *H04N 5/2256* (2013.01); *H04N 5/2355* (2013.01)

(58) Field of Classification Search
      CPC .............. H04N 5/23293; H04N 5/2353; G06F 3/04817; G06F 3/04842; G06K 9/00255; G06K 9/00315
      USPC .......... 348/229.1, 254, E5.037, E5.034, 239, 348/362; 382/274
      See application file for complete search history.

(56) References Cited

U.S. PATENT DOCUMENTS

| | | | | |
|---|---|---|---|---|
| 2007/0229863 A1* | 10/2007 | Ono | ........................ | G06T 5/008 358/1.9 |
| 2007/0286523 A1* | 12/2007 | Kim | ........................ | G06T 5/009 382/274 |
| 2008/0036976 A1* | 2/2008 | Han | ........................ | H04N 9/3194 353/69 |
| 2008/0210430 A1* | 9/2008 | Al-Muraikhi | ........... | E21B 43/08 166/313 |
| 2009/0174640 A1* | 7/2009 | Nose | .................... | G09G 3/3629 345/88 |
| 2009/0244386 A1 | 10/2009 | Norgaard | | |
| 2010/0134537 A1* | 6/2010 | Nose | .................... | G09G 3/2014 345/690 |
| 2010/0165193 A1* | 7/2010 | Kanai | ...................... | H04N 5/58 348/453 |
| 2010/0290702 A1* | 11/2010 | Yu | .......................... | G06T 5/009 382/171 |
| 2011/0115942 A1* | 5/2011 | Kurita | .................. | H04N 5/2355 348/223.1 |
| 2011/0285913 A1 | 11/2011 | Astrachan | | |
| 2012/0008015 A1* | 1/2012 | Manabe | ............... | H04N 5/2355 348/234 |
| 2012/0328205 A1* | 12/2012 | Wen | ...................... | H04N 19/51 382/233 |
| 2013/0121576 A1 | 5/2013 | Hsu | | |
| 2016/0104272 A1 | 4/2016 | Shieh et al. | | |
| 2017/0094240 A1* | 3/2017 | Saito | ........................ | H04N 9/73 |
| 2017/0208309 A1* | 7/2017 | Oike | .................... | H04N 9/3194 |
| 2017/0243325 A1* | 8/2017 | Sasaki | .................... | G06T 3/4007 |
| 2017/0249721 A1* | 8/2017 | Hirai | ........................ | G06T 5/001 |
| 2018/0061029 A1* | 3/2018 | Suzuki | ..................... | G06T 5/00 |

FOREIGN PATENT DOCUMENTS

| | | |
|---|---|---|
| JP | 2012-049636 | 3/2012 |
| JP | 2014-179807 | 9/2014 |

OTHER PUBLICATIONS

Partial European Search Report for 17182727.2 dated Dec. 20, 2017.
Kasai, Akira, "Standard Retouching Technique Utilizing YCrCb Color", InfoArts Inc., pp. 1-7, 2006 (with Partial Translation).
U.S. Appl. No. 15/597,658, filed May 17, 2017.

\* cited by examiner

FIG.4
(a) ORIGINAL IMAGE (b) CORRECTION TONE CURVE (c) SATURATION-ENHANCED IMAGE
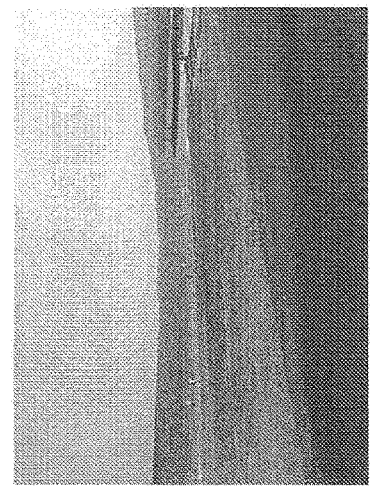
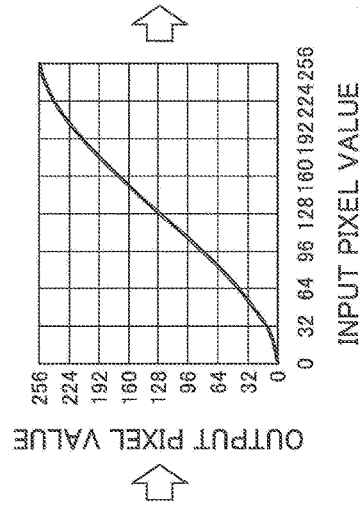
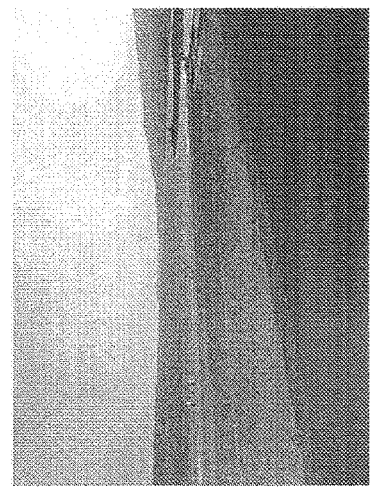
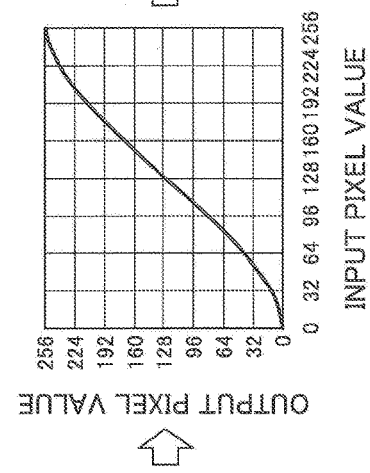

FIG.7
(a) ORIGINAL IMAGE
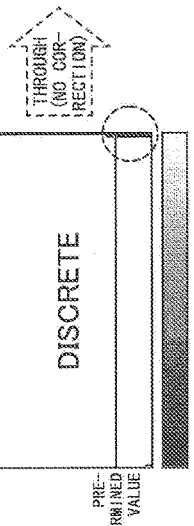
(b) HISTOGRAM
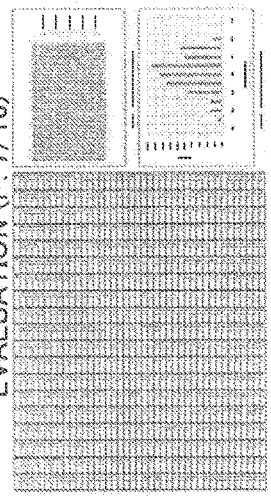
(c) OUTPUT IMAGE
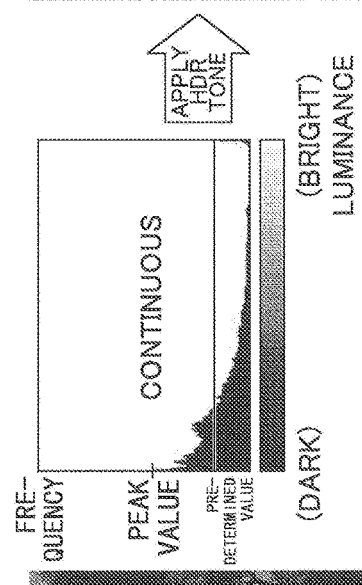
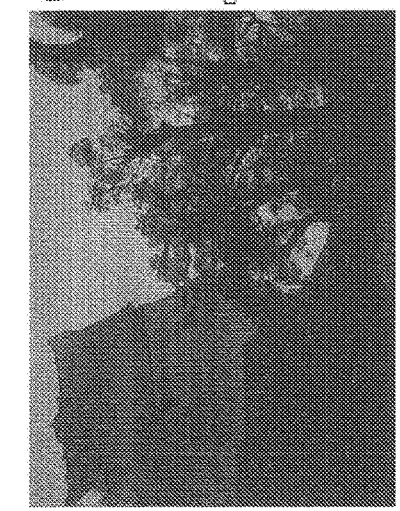
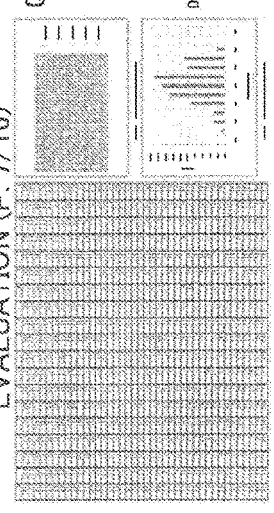

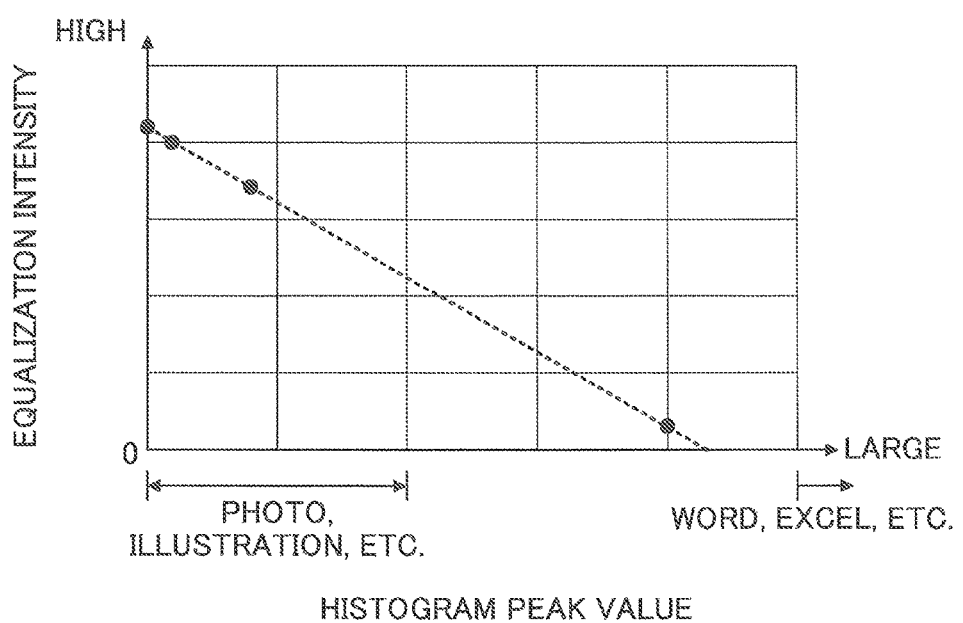

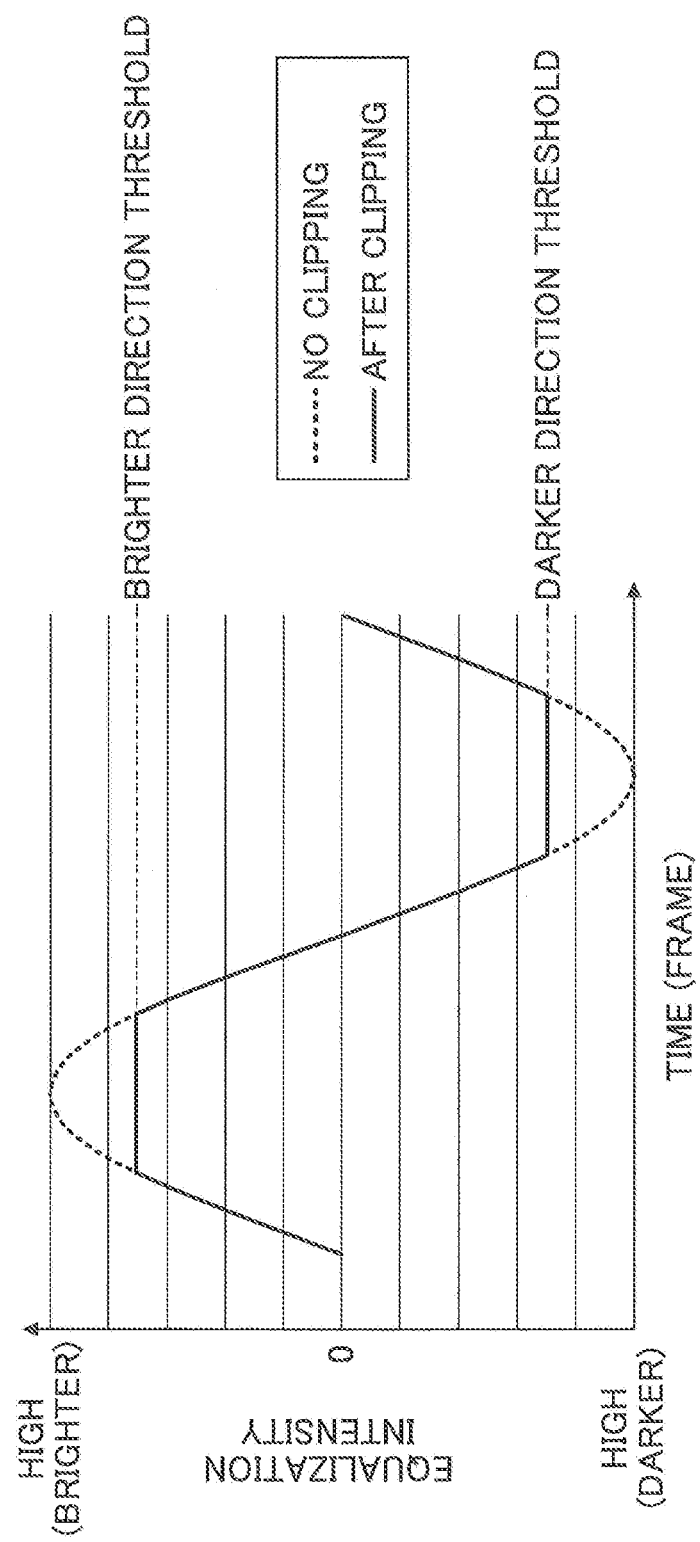

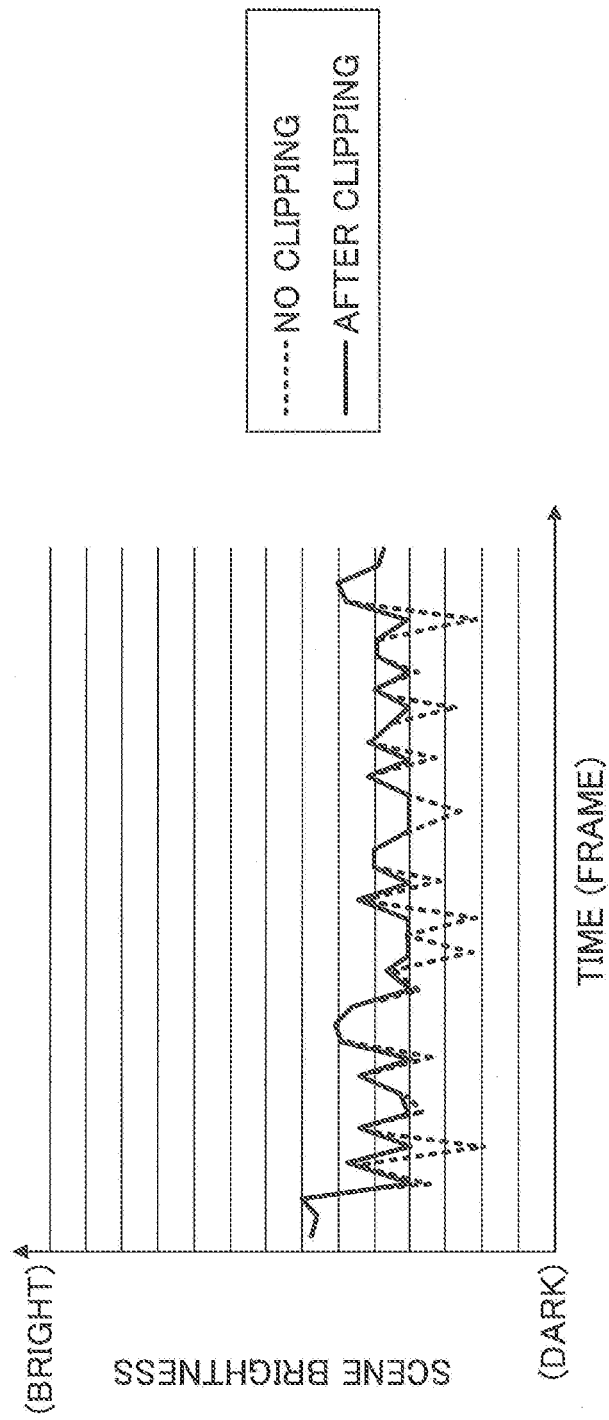

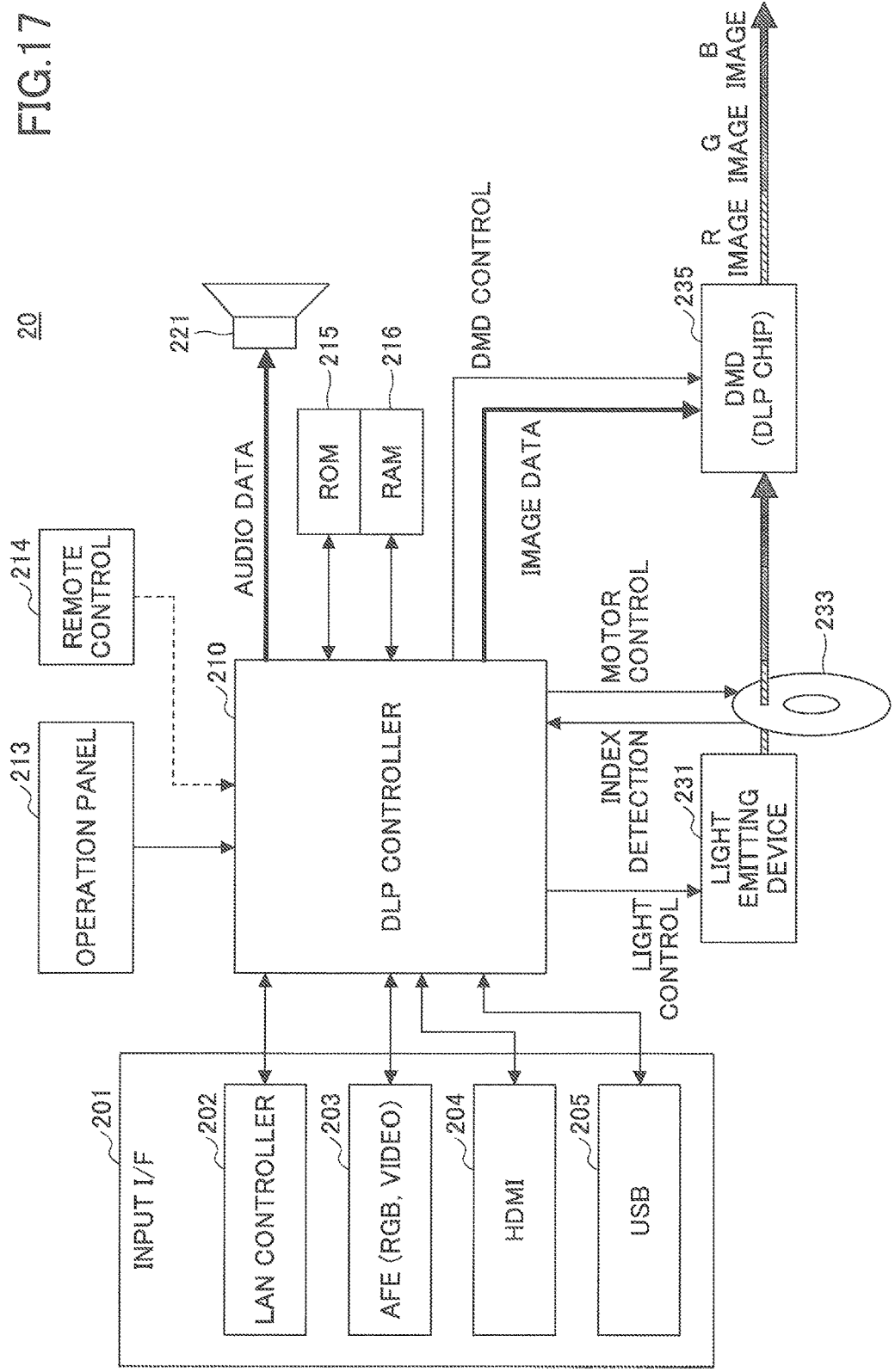

IMAGE PROCESSING APPARATUS, IMAGE PROJECTION APPARATUS, AND IMAGE PROCESSING METHOD

CROSS-REFERENCE TO RELATED APPLICATIONS

The present application claims priority under 35 U.S.C. § 119 to Japanese Patent Application No. 2016-151602 filed on Aug. 1, 2016 and Japanese Patent Application No. 2017-108697 filed on May 31, 2017, the entire contents of which are incorporated herein by reference.

BACKGROUND OF THE INVENTION

1. Field of the Invention

The present invention relates to an image processing apparatus, an image projection apparatus, and an image processing method.

2. Description of the Related Art

There is a substantial difference between the dynamic range of luminosity of an image that can be displayed by an image display apparatus or an image projection apparatus (display image, projection image, etc.) and the dynamic range of human vision. For example, the dynamic range of human vision is on the order of $10^{10}$, whereas the dynamic range of a general LDR (Low Dynamic Range) display is on the order of $10^3$ to $10^5$ (see, e.g., FIG. 1). As such, the image may lack adequate contrast in luminosity.

In this respect, attention is being directed to HDR (High Dynamic Range), which is a technique for substantially widening the dynamic range of luminosity of a display as compared with a normal display.

There are two major methods of implementing HDR. One approach involves increasing the luminance of the display itself to several thousand nit (the luminance of LDR is several hundred nit), and the other approach involves performing image processing on an image displayed on an LDR display to convert the image into an HDR tone image.

When the luminance of the display itself is substantially increased, power consumption will increase due to the increase in luminance and cost increase becomes inevitable.

As for the other approach for implementing HDR, there are multiple image processing methods that may be used. For example, a histogram equalization technique as illustrated in FIG. 2 may be used.

By applying histogram equalization to an original image (see, e.g., upper graph of FIG. 2) to widen the histogram and expand portions where the histogram distribution is concentrated (see, e.g., bottom graph of FIG. 2), the dynamic range within the reproduction range of the display may be increased to thereby increase contrast of the image (see, e.g., Japanese Unexamined Patent Publication No. 2012-049636).

However, in a color image, if the histogram of each color of the RGB color channels is different, color imbalances may be created when histogram equalization is directly performed on the RGB signals because the histograms of the R, G, and B color channels may be widened to different extents, for example.

In this respect, a technique is known that involves applying different processes with respect to a luminance image (Y) and a color difference image (CrCb) in retouching an image into a desired image (see, e.g., Kasai, Akira. "Standard Retouching Technique Utilizing YCrCb Color.").

However, histogram equalization has relatively little effect when the histogram for image content of an original image is already wide to begin with. That is, the luminance enhancing effect of histogram equalization depends on the image content. For example, contrast may be improved by implementing histogram equalization in a case where the histogram of an image to be processed is a relatively continuous histogram, such as the histogram of a natural image. However, in a case where the image content of the image to be processed is close to a binary image, such as text or a chart, for example, histogram equalization would not be suitable for improving contrast because the histogram is localized.

Also, note that existing image processing techniques are typically adapted for application to still images but do not contemplate application to moving images.

SUMMARY OF THE INVENTION

An aspect of the present invention is directed to providing an image processing apparatus that is capable of adjusting the histogram equalization correction intensity of a histogram equalization process that is applied to each frame of a moving image according to the content of each frame of the moving image without giving an awkward impression to a viewer.

According to one embodiment of the present invention, an image processing apparatus is provided that includes an input image color space conversion unit configured to convert an input image signal of each frame of a moving image signal into a luminance image signal and a color difference image signal, a luminance image correction unit configured to implement a luminance image correction process for generating a luminance-corrected image signal by applying a histogram equalization process to the luminance image signal of each frame, a color difference image correction unit configured to implement a color difference image correction process for generating a color-difference-corrected image signal by applying a saturation enhancement process to the color difference image signal of each frame, and an output image color space conversion unit configured to convert the luminance-corrected image signal and the color-difference-corrected image signal into an output image signal that is in the same format as the input image signal. The luminance image correction process implemented by the luminance image correction unit and the color difference image correction process implemented by the color difference image correction unit are executed in parallel with respect to each frame. The luminance image correction unit adjusts a histogram equalization correction intensity of the histogram equalization process with respect to each frame.

BRIEF DESCRIPTION OF THE DRAWINGS

FIG. 4 is diagram illustrating examples of image correction using an S-shaped tone curve to enhance saturation;

FIG. 7 is a diagram illustrating classification determination for determining whether histogram equalization is to be turned on/off;

FIGS. 14A-14C are diagrams illustrating clipping of a histogram equalization intensity according to a second control example of the present invention;

FIG. 17 is a block diagram illustrating an example configuration of the DLP projector.

DESCRIPTION OF THE PREFERRED EMBODIMENTS

Figure 1:
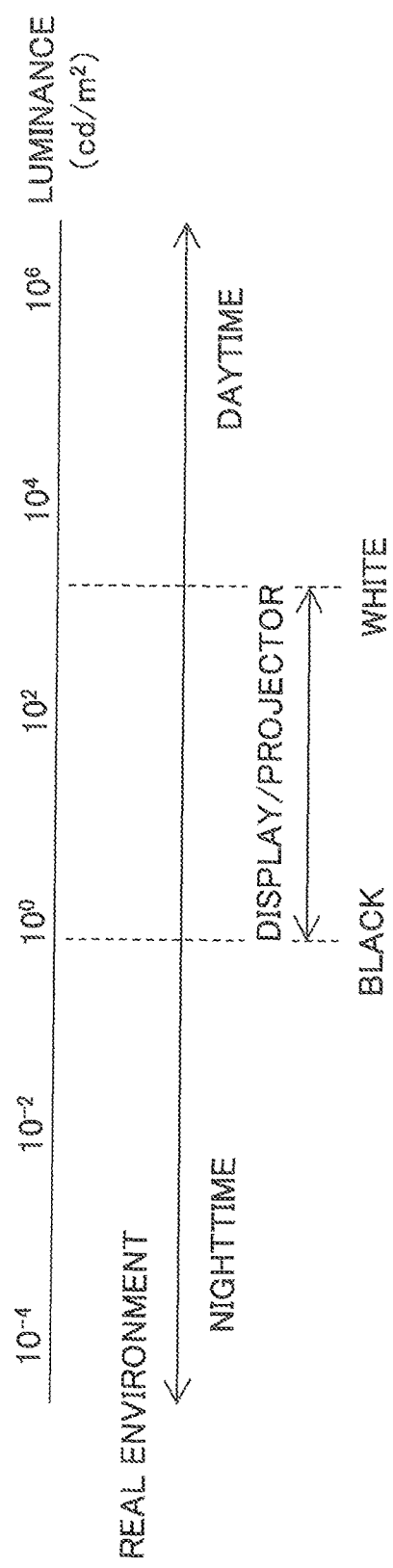
FIG. 1 is a schematic diagram illustrating compression of a dynamic range for a general low dynamic range display.

In the following, embodiments of the present invention are described with reference to the accompanying drawings. Note that in the drawings, elements having the same features and functions are given the same reference numerals and their descriptions may be omitted.

[Overall Configuration]

Figure 3:
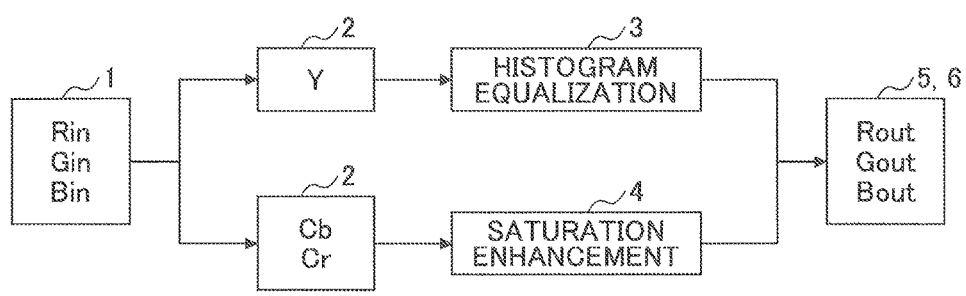
FIG. 3 is a diagram illustrating an example schematic configuration of an image processing apparatus according to an embodiment of the present invention.

FIG. 3 is a diagram illustrating a schematic configuration of an image processing apparatus 10 according to an embodiment of the present invention. The image processing apparatus 10 according to the present embodiment includes an input image (RGB) storage unit 1, an RGB-YCbCr conversion unit 2, a luminance image correction unit 3, a color difference image correction unit 4, a YCbCr-RGB conversion unit 5, and an output image (RGB) storage unit 6. As described below with reference to FIG. 11, the image processing apparatus 10 may further include a memory color reflection unit 7 and a setting information acquisition unit 8.

In FIG. 3, RGB input signals of each frame of a moving image (Rin, Gin, Bin) are converted into YCbCr signals (luminance and color difference signals), and different processes are performed with respect to the Y (luminance) signal and CbCr (blue color difference and red color difference) signals.

That is, image correction that involves applying a histogram equalization process (also referred to as histogram flattening or averaging) is performed with respect to the luminance image (Y), and image correction that involves applying a saturation enhancement process is performed with respect to the chrominance image (CbCr).

Note that by using the converted YCbCr signals as the image correction target, the processing load for applying the histogram equalization process to the luminance (Y) signal may be reduced, and because histogram equalization is executed only with respect to the luminance (Y) signal, color balance may also be maintained, for example.

In parallel with the histogram equalization process, the saturation enhancement process is applied to the color difference (CbCr) signals to increase color saturation and further improve HDR tone.

Specifically, the RGB-YCbCr conversion unit 2, which is an example of an input image color space conversion unit, executes the following conversion algorithms.

First, RGB input signals (Rin, Gin, Bin) are converted into YCbCr signals (Yin, Cbin, Crin) using the following formulas (1) to (3).

For example, in the present description, it is assumed that the RGB signals are 10-bit RGB signals having values between 0 to 1023.

$$Yin=(77*Rin+150*Gin+29*Bin)>>8; \quad (1)$$

$$Cbin=((-43*Rin-85*Gin+128*Bin)>>8)+512; \quad (2)$$

$$Crin=((128*Rin-107*Gin-21*Bin)>>8)+512; \quad (3)$$

Note that ">>" is a shift operation; "<<" means shift to the left side by the designated number of bits and ">>" means shift to the right side by the designated number of bits.

In this way, YCbCr signals that are converted into integers are used as luminance and color difference signals. For conversion between RGB and YCbCr, integer operations and shift operations are used.

Note that the above formulas (1) to (3) mean shifting to the right by 8 bits, that is, division by 256 (28). Because division is wasteful in hardware implementation, substituting division with a shift operation may be advantageous.

After converting the RGB input image signals into YCbCr signals as described above, saturation enhancement is performed with respect to the CbCr (blue color difference and red color difference) signals (see FIG. 4), and histogram equalization is performed with respect to the Y (luminance) signal (see FIGS. 5 to 9).

Also, the YCbCr-RGB conversion unit 5, which is an example of an output image color space conversion unit, uses the following formulas (4) to (6) to convert YCbCr values (Yout, Cb_out, Cr_out) including the CbCr signals that have been subjected to saturation enhancement and the Y signal that has been subjected to histogram equalization into output RGB values (Rout, Gout, Bout) in the same format as the input RGB image signals as output image signals.

$$Rout=(256*Yout+359*(Cb\_out-512))>>8; \quad (4)$$

$$Gout=(256*Yout-88*(Cb\_out-512)-183*(Cr\_out-512))>>8; \quad (5)$$

$$Bout=(256*Yout+441*(Cb\_out-512))>>8; \quad (6)$$

The above formulas are for RGB image signals of 10 bits each, and if the conversion results deviate from the range of 10 bits (0 to 1023), clipping is performed to confine the image signal values to be within this range.

<Saturation Correction>

In the following, the saturation enhancement process that is applied to the CbCr (color difference) signals that have been converted from the input RGB signals will be described.

FIG. 4 illustrates image correction examples using an S-shaped tone curve to enhance saturation. To achieve high-speed processing in saturation enhancement, an S-shaped tone curve is preferably used as a look-up table.

Assuming "Satu_Curve" (gradation conversion function) represents the look-up table, the Cb (blue color difference) signal and Cr (red color difference) signal are multiplied by the gradation conversion function and converted into output values as indicated by the following formulas (7) and (8).

$$Cb\_out=Satu\_Curve[Cb\_in]; \quad (7)$$

$$Cr\_out=Satu\_Curve[Cr\_in]; \quad (8)$$

Note that the relationship between the input pixel value and the output pixel value in the lookup table, i.e., the gradation conversion function forms an S-shaped tone curve when represented by a graph.

By using such an S-shaped tone curve, the midtones of a low contrast image having a histogram distribution concentrated at the center may be expanded to thereby enhance the contrast. That is, the high pixel value portion of the color difference image may be made higher and the lower pixel value portion may be made lower.

In this way, saturation can be suitably enhanced without changing color.

As indicated in TABLE 1 below, in some embodiments, gradation conversion functions forming S-shaped tone curves having different correction intensity levels may be provided and a desired correction intensity level for saturation enhancement may be selected from these gradation conversion functions and used to correct the output image (output image signals), for example.

TABLE 1

| COLOR DIFFERENCE CORRECTION INTENSITY LEVEL | LOW | MEDIUM | HIGH |
|---|---|---|---|
| TONE CURVE SHAPE | S-SHAPED TONE CURVE (CLOSE TO DIAGONAL STRAIGHT LINE) | S-SHAPED TONE CURVE (MEDIUM SLOPE) | S-SHAPED TONE CURVE (LARGE CURVATURE & SLOPE) |

By performing such saturation enhancement, a visual effect referred to as Helmholtz-Kohlrausch effect (H-K effect) can be achieved. The H-K effect is a visual effect in which a color is perceived to have increased brightness as the color saturation increases even if the brightness is the same. As such, the H-K effect may be useful in implementing HDR tone adjustment.

Note that because the color of a DLP (Digital Light Processing) projector tends to be darkened as described below with reference to FIG. 16, saturation enhancement, which can make colors more vivid, is effective for improving image quality.

Also, note that in some embodiments, the gradation conversion function used for saturation enhancement can be substantially simplified.

For example, even when the input values of the CbCr signals are 10 bits, but the converted CbCr signal values converted by the gradation conversion function are reduced to 7 bits (0 to 127) rather than 10 bits (0 to 1023), image degradation can hardly be perceived.

Because human vision is less sensitive to color difference (CbCr) as compared with luminance (Y), image degradation is less likely to be perceived even CbCr processing is simplified.

Thus, processing may be implemented to reduce the number of bits in the color-difference-corrected image signals to be generated as compared with the number of bits in the input color difference image signals. In this way, the calculation processing burden for processing the color difference image signals may be reduced to thereby reduce the hardware logic scale and increase processing speed, for example.

<Luminance Correction>

In the following, a method of generating a luminance-corrected image signal using a histogram equalization process with respect to the luminance (Y) signal is described.

Figure 5:
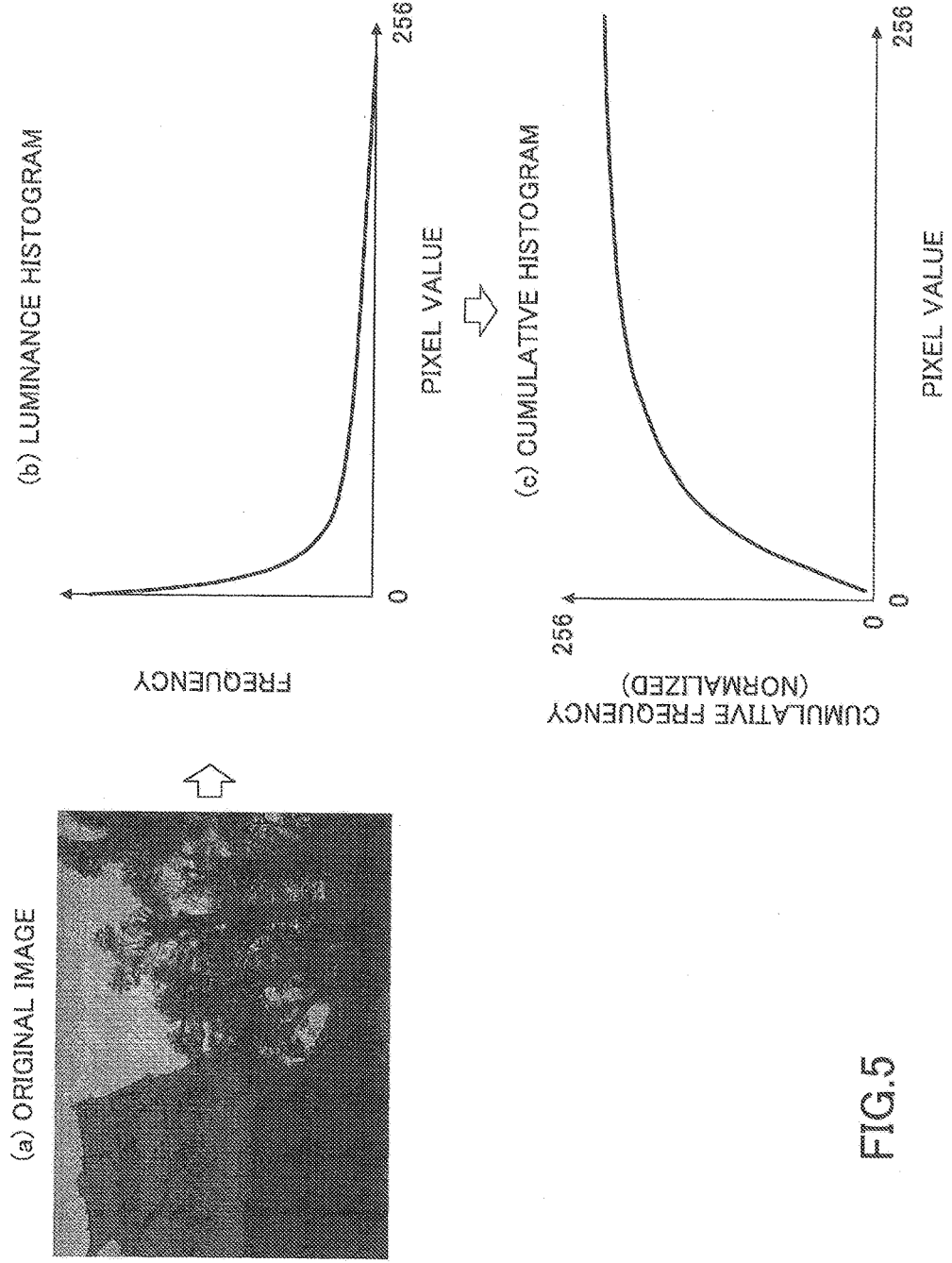
FIG. 5 is a diagram illustrating an example of creating a luminance histogram and a cumulative histogram for an image.
Figure 6:
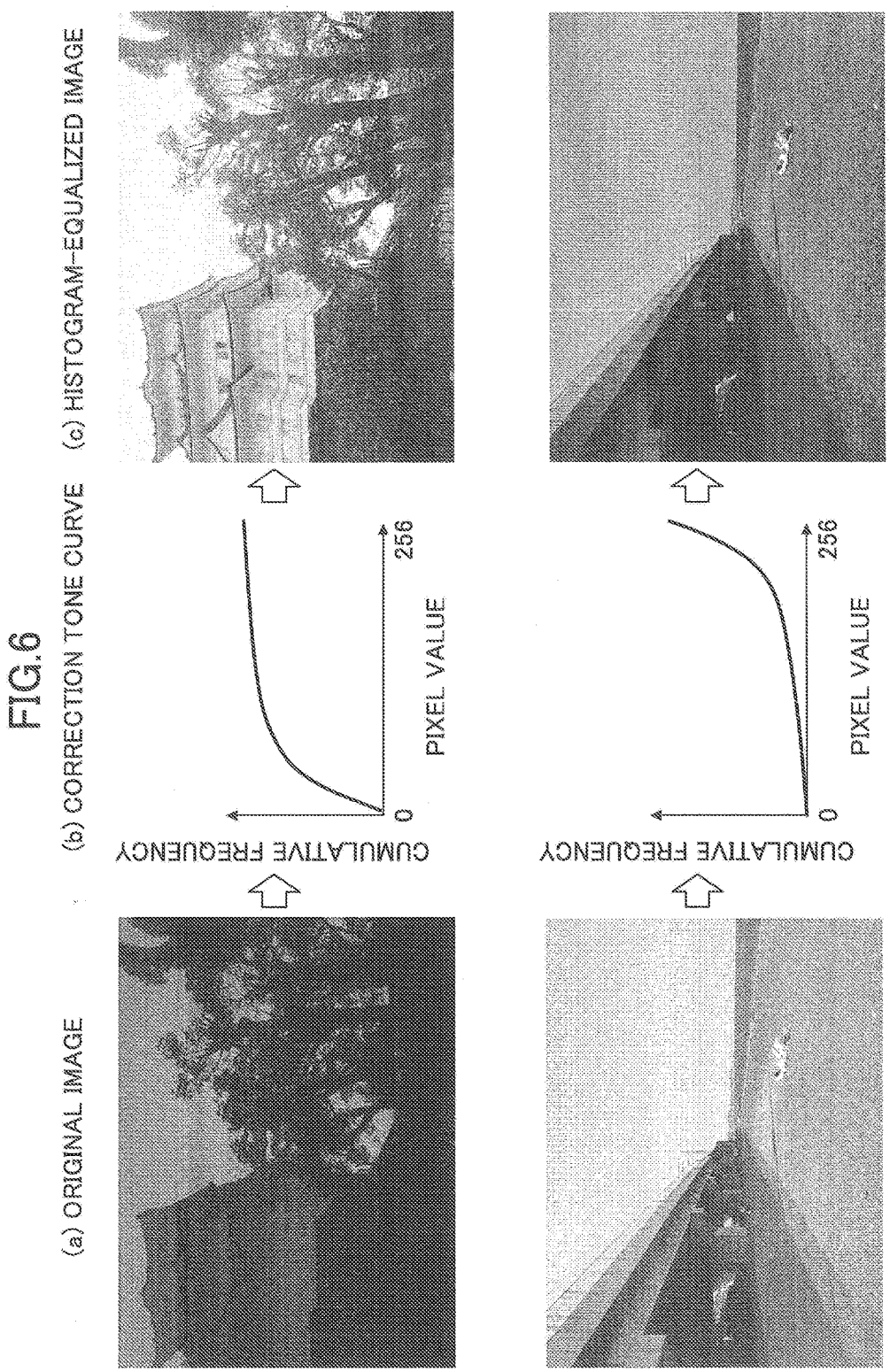
FIG. 6 is a diagram illustrating tone curve conversion examples using a cumulative histogram as a lookup table and histogram equalization image correction examples.

FIG. 5 illustrates examples of a luminance histogram and a cumulative histogram created from a luminance image (original image). FIG. 6 illustrates tone curve conversion examples using a cumulative histogram as a lookup table and histogram equalization image correction examples.

First, the luminance image (Y) obtained by the conversion process using the above formula (1) is used to create a luminance histogram. Note that in creating the luminance histogram, the processing load can be reduced by spatially thinning down the luminance image to histogram creation target pixels.

For example, sampling may be performed in the horizontal direction and the vertical direction with respect to every 16 pixels and the luminance histogram can be obtained from the sampled pixels. Note that even if the pixels of the luminance image are thinned down, properties of the histogram, i.e., image quality, may not be substantially affected while the processing load can be substantially reduced.

Assuming the YCbCr image supports 10-bits, the matrix for storing the luminance histogram is 1024 steps (Org_Hist [0] to Org_Hist [1023]), and as such, the luminance histogram for one frame of the target video (moving image) can be obtained using the following formula (9). Note that in the following formula (9), "++" means that the frequency of the histogram is added one by one. Note that the graph at the upper right side of FIG. 5 illustrates an example of the luminance histogram obtained for the original image. In this graph that schematically represents a luminance histogram, the horizontal axis represents the pixel value (luminance), and the vertical axis represents the frequency.

$$Org\_Hist[Yin]++; \quad (9)$$

Then, a cumulative histogram is created based on the above luminance histogram. More specifically, as indicated by the following formula (10), the range of the cumulative histogram is set to Sum_Hist[0] to Sum_Hist[1023] and the frequencies within that range are sequentially cumulated to create the cumulative histogram. Note that the graph at the bottom right side of FIG. 5 illustrates an example of the cumulative histogram. In this graph, the horizontal axis represents the pixel value (luminance), and the vertical axis represents the cumulative frequency (normalized frequency, relative ratio). Note that when arranging this graph into a correction tone curve, the horizontal axis may be arranged to represent an input pixel value and the vertical axis may be arranged to represent an output pixel value, for example.

```
cnt = 0;                                                                    (10)
for(i = 0; i < 1024; i++){    //repeat for 0-1023
    cnt += Org_Hist[i];       // frequency of histogram accumulated in cnt
    Sum_Hist[i] = cnt;        // set accumulated frequency in this address
}
```

In order to use the cumulative histogram frequency as a look-up table for luminance correction, the cumulative histogram is normalized to the range of 10 bits (0 to 1023) to obtain a normalized histogram of Equ_Table [0] to Equ_Table [1023].

Figure 2:
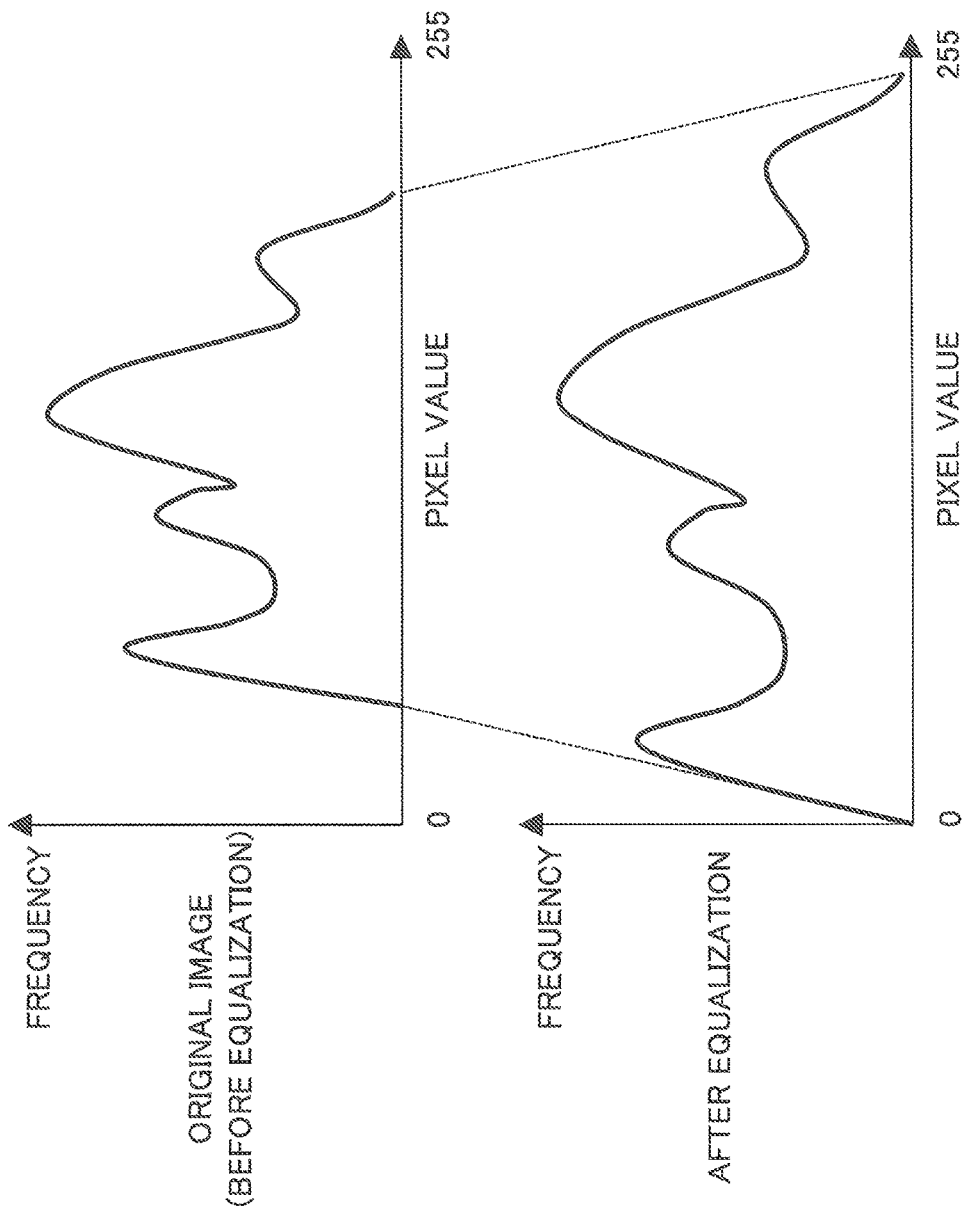
FIG. 2 is a conceptual diagram illustrating histogram equalization.

The cumulative histogram at the bottom right side of FIG. 5 is normalized to the range of 0 to 1023 (see, e.g., bottom graph of FIG. 2) using the following formula (11).

```
for(i = 0; i < 1024; i++){    // repeat for 0-1023             (11)
Equ_Table[i]
= (Sum_Hist[i] − Sum_Hist[0]) * 1023 / (Sum_Hist[1023] −
Sum_Hist[0]);
}
```

The normalized histogram of Equ_Table [0] to Equ_Table [1023] obtained using the above formula (11) is used as a luminance correction lookup table for an output image as indicated by the following formula (12).

$$Yout = Equ\_Table[Yin]; \quad (12)$$

In the following, specific examples of luminance correction using a cumulative histogram are described with reference to FIG. 6. In the case of performing luminance correction on dark image content as illustrated on the upper left side of FIG. 6, an equalization tone curve (correction tone curve) based on the cumulative histogram is high key and forms a convex shape as illustrated at the upper middle portion of FIG. 6. With such an equalization tone curve, an image may be corrected to have increased brightness.

On the other hand, in the case of performing luminance correction on bright image content as illustrated at the bottom left side of FIG. 6, the equalization tone curve based on the cumulative histogram is low key and forms a concave shape as illustrated at the bottom middle portion of FIG. 6. With such an equalization tone curve, an image may be corrected to have reduced brightness.

However, when the cumulative histogram is used as a look-up table as is, overcorrection may occur depending on the image content of the moving image. In this respect, measures are preferably implemented to enable adjustment of the correction intensity so that the correction effect can be weakened as necessary.

<Adjustment of Histogram Equalization>

Figure 8:
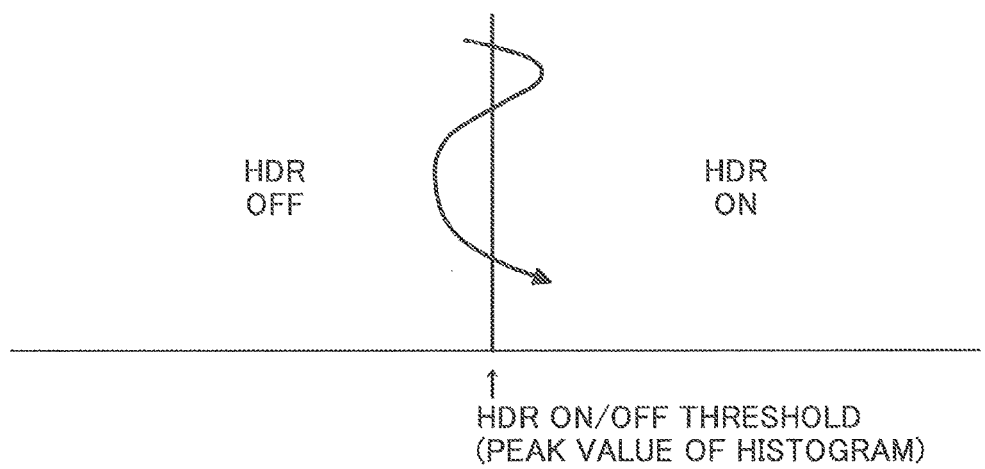
FIG. 8 is a diagram illustrating an example transition of a weighting coefficient of a histogram-equalized image and an original image when creating a corrected image of a moving image according to a first control example of the present invention.

FIG. 7 is a diagram illustrating an example classification determination for determining whether histogram equalization should be turned on/off. FIG. 8 shows an example transition of the mix ratio of histogram-equalized images and original images upon creating corrected-images (signals) of a moving image as a first control example according to an embodiment of the present invention.

The histogram equalization process as described above may be implemented without any issues as long as the histogram is a continuous histogram such as that of a natural image (see, e.g., upper left side image of FIG. 7). However, in the case where the image content is close to a binary image, such as text or a chart (see, e.g., bottom left side image of FIG. 7), the histogram of the image content is localized, and unnecessary gradation conversion may result in undesirable luminance conversion, for example. That is, whether image correction by histogram equalization would be appropriate depends on the image content.

For example, in the case where the image content is a solid black image with all the pixels being black (0) pixels, the histogram frequency concentrates on Org_Hist[0], and as such, the cumulative histogram of the image will be a fixed value within the range of Sum_Hist[0] to Sum_Hist [10236]. Thus, applying histogram equalization to the black solid image may produce inappropriate conversion results including pixels that are not black.

Also, in addition to the above example of a solid black image, if the image content is close to a binary image, such as text or a chart (see, e.g., bottom left side of FIG. 7), inappropriate conversion similar to the above-described black color conversion of the black solid image may occur.

In order to prevent such inappropriate conversion, a convenient determination is preferably made as to whether the histogram of the image content is continuous or discrete. If the histogram is determined to be continuous, histogram equalization is performed. If the histogram is determined to be discrete, histogram equalization is not performed and the Yin value (input luminance image) is passed through without undergoing correction processing. That is, a non-processing tone curve corresponding to a diagonal straight line that is sloped upward to the right is used as the input/output tone curve. As a result, the original image is output as the output image.

Note that although dispersion and standard deviation of the histogram can be used to determine whether the histogram is continuous or discrete based on the image content, the processing load may be quite large in such case.

In this respect, as an example determination method with a relatively light processing load, a peak value of the histogram Org_Hist may be used. Because the total frequency of the histogram is the number of pixels making up the image content, if the peak value, which is the maximum frequency of occurrence of a pixel value, is less than a predetermined peak value with respect to the total frequency of the histogram, the histogram may be determined to be continuous, and if the peak value is greater than or equal to the predetermined peak value, the histogram may be determined to be discrete. Note that examples of the histogram peak value are indicated in the upper and bottom histograms of FIG. 7. It is assumed that the peak value of the bottom histogram at the right end has reached the threshold (predetermine peak value).

Note that the "predetermined peak value" that is used as a threshold may be set to around $\frac{1}{16}$ of the maximum frequency and the denominator is preferably a power of 2 for purposes of hardware implementation.

Alternatively, the ratio of luminance values occurring at a frequency exceeding a predetermined value (which is less than the predetermined peak value) with respect to all the luminance values (pixel values) may be determined, and it may further be determined whether this ratio is greater than or equal to a predetermined ratio. If the ratio is greater than or equal to the predetermined ratio, the histogram may be determined to be continuous. If the ratio is less than the predetermined ratio, the histogram may be determined to be discrete. Note that examples of the predetermined value used for determining the above-described ratio are also indicated in the upper and bottom histograms of FIG. 7.

As described above, histogram equalization may be switched on/off according to the image content by determining whether the histogram is continuous or discrete using the peak value of the histogram or the ratio of luminance values occurring at a frequency exceeding a predetermined value.

However, when on/off switching based on the peak value and the predetermined peak value as a threshold for the peak value is applied to a moving image as described above, an inappropriate moving image may be produced when the peak value hovers above and below the on/off threshold from one frame to another frame such that histogram equalization is switched back and forth multiple times, for example.

<First Control Example>

To avoid such a phenomenon, according to a first control example, the histogram equalization correction intensity is gradually changed.

That is, in the case where it is determined a moving image to be processed will require frequent on/off switching of histogram equalization, a count value "hdr_frame_cnt" counting the number of consecutive frames over which histogram equalization will be switched on/off is used as a weighting coefficient to gradually change the histogram equalization correction intensity. In this way, on/off switching of histogram equalization may be controlled to transition more gradually based on the image content as illustrated in FIG. 8, and as a result, a viewer viewing the corrected moving image may be less likely to feel a sense of awkwardness, for example.

<Histogram Equalization Correction Intensity Adjustment by Mix Ratio Adjustment>

To control the on/off transition of histogram equalization (HDR conversion), a correction tone curve is synthesized by combining the equalization tone curve of FIG. 6 obtained by creating a cumulative histogram of an original image as a look-up table and the non-processing tone curve (diagonal straight line sloped upward to the right for outputting an input pixel value as is). Then, this correction tone curve is used to create a luminance-corrected image (signal).

In synthesizing the correction tone curve, the mix ratio of the equalization tone curve to the non-processing tone curve may be weighted and adjusted based on a determination value (count value) so that the correction intensity of histogram equalization of the luminance-corrected image can be adjusted.

Note that correction based on mix ratio adjustment of a tone curve is implemented with respect to each frame as described below.

For example, when it is determined, based on a comparison of the peak value of the histogram of a frame and the predetermined peak value or based on the ratio of pixel values (luminance values) occurring at a frequency greater than or equal to a predetermined value, that histogram equalization is to be switched off (histogram equalization "off" condition), the count value (determination value) "hdr_frame_cnt" is decremented.

When the histogram equalization "off" condition is determined, the count value of the frame counter is decremented, that is, "−1" subtraction is applied.

$$\text{hdr\_frame\_cnt--;} \qquad (13)$$

Note, however, that the lower limit of the count value "hdr_frame_cnt" is set to zero (0).

On the other hand, when a histogram equalization "on" condition is determined, the count value of the frame counter is incremented, that is, "+1" addition is applied.

$$\text{hdr\_frame\_cnt++;} \qquad (14)$$

The upper limit for the count value "hdr_frame_cnt" may be any arbitrary value, such as 32 frames or 64 frames, for example. Note, however, that the greater the upper limit, the more gradual the on/off transition of histogram equalization.

By setting the count value to the determination value of accumulated past frames and weighting the on/off transition of histogram equalization, on/off switching of histogram equalization may be controlled to be gradual and abrupt on/off switching of histogram switching may be prevented.

The following formula (15) illustrates an example where the correction intensity of histogram equalization can be adjusted to 32 different levels and histogram switching can be transitioned on/off over 32 frames.

$$\text{Yout} = ((32 - \text{hdr\_frame\_cnt}) * \text{Yin} + \text{hdr\_frame\_cnt} * \text{Equ\_Table[Yin]}) / 32; \qquad (15)$$
$$(\text{but, } 0 \le \text{hdr\_frame\_cnt} \le 32)$$

By gradually changing the correction intensity of histogram equalization as described above, visual impressions of awkwardness may be reduced when histogram equalization is switched on/off.

Note that although the count value is changed by ±1 in the above-described example, the count value may be incremented/decremented by some other adequately small number (e.g., a number between 1 to 5) relative to a count range of the count value (e.g., 0 to 31, 0 to 63).

<Creation of Composite Image>

Figure 9:
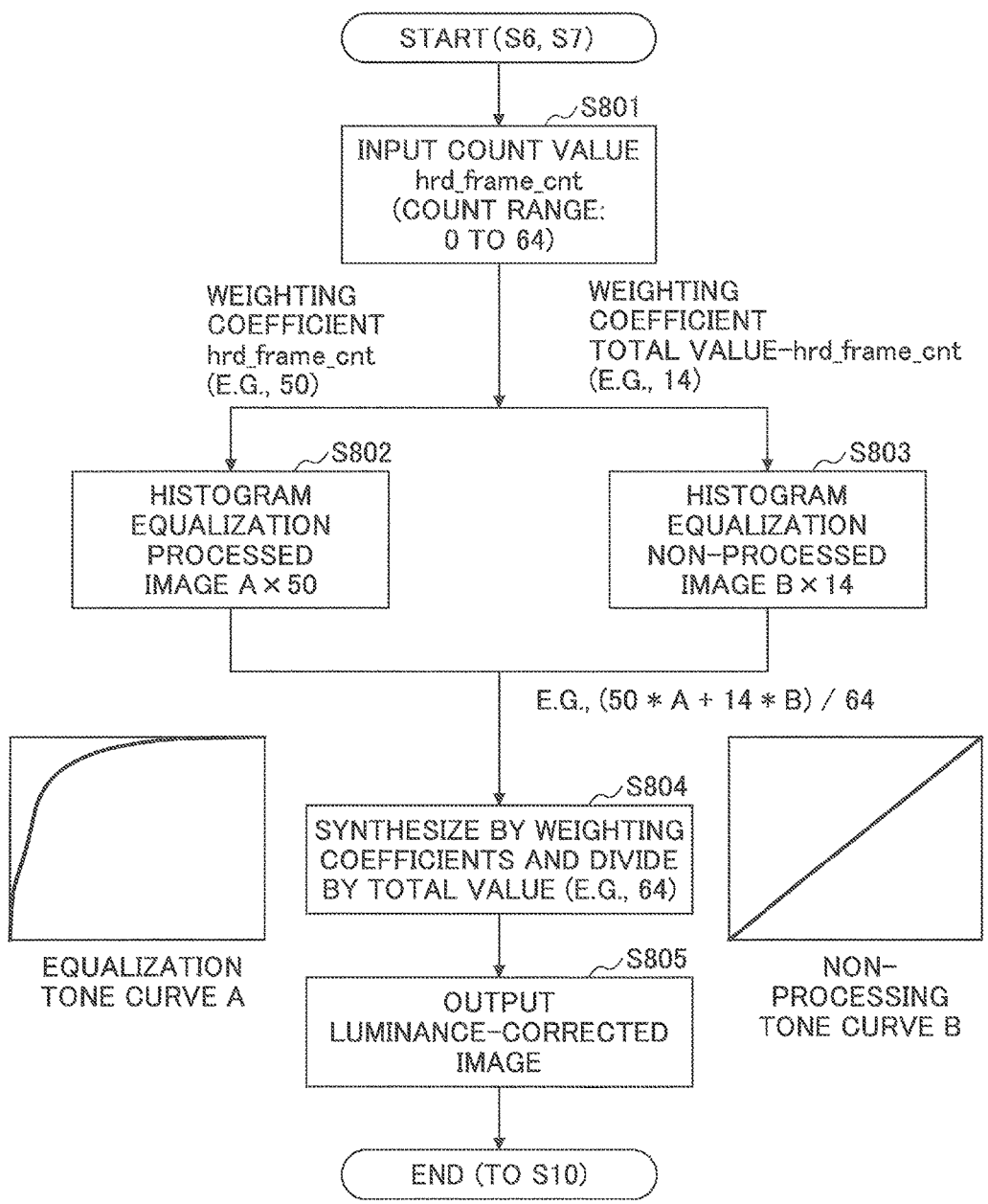
FIG. 9 is a flowchart illustrating a weighted composite image creation process.

FIG. 9 is a schematic flowchart illustrating a weighted composite image creation process. Note that the process of FIG. 9 corresponds to step S8 of FIG. 12, which is described below.

In step S801, a count value is input. Note that the count value is an example of a weighting coefficient. For example, as described above with reference to the formulas (13) to (15), if a total value is 64 and one of the count values (weighting coefficients) "hdr_frame_cnt" is 50, the other count value (weighting coefficient) is 14.

In step S802, an image A corresponding to a histogram equalization processed image is multiplied by a weighting coefficient (e.g., 50). Specifically, an equalization tone curve for the histogram equalization processed image is multiplied by the weighting coefficient.

In step S803, an original image B corresponding to a histogram equalization non-processed image is multiplied by the number obtained by subtracting the weighting coefficient from the total value (e.g., 14). Specifically, the non-processing tone curve (diagonal straight line) for the original image is multiplied by the other weighting coefficient.

Then, in step S804, a composite image is created by combining and synthesizing the histogram equalization processed image obtained by multiplying the count value in step S802 and the original image multiplied by the other count value that is obtained by subtracting the count value from the total value in step S803 and dividing the synthesized image by the total value (e.g., 64). As a specific example, an equalization tone curve multiplied by a weighting coefficient (e.g., 50) and a non-processing tone curve (diagonal straight line) multiplied by the number (e.g., 14) that is obtained by subtracting the weighting coefficient (e.g., 50) from the total value (e.g., 64) are added together and divided by 64 to create a correction tone curve.

Then, in step S805, the created image is output. Specifically, a luminance-corrected image (signal) is output using the correction tone curve as a look-up table (by multiplying the luminance input image by a tone conversion coefficient corresponding to the correction tone curve when graphed).

Thus, when a moving image to be processed requires frequent on/off switching of histogram equalization as illustrated in FIG. 8, a count value "hdr_frame_cnt" counting a consecutive number of frames is used as a weighting coefficient to gradually change the mix ratio of an equalization tone curve and a non-processing toner curve in switching on/off image correction by histogram equalization as illustrated in FIG. 9. In this way, viewers may be less likely to sense some awkwardness due to on/off switching of histogram equalization.

<Intensity Level Adjustment of Cumulative Histogram>

In the following, an example method of adjusting the range of luminance correction using a cumulative histogram by setting up a pre-designated intensity level of luminance correction is described. It is assumed that such setting is selected independent of the image content and is used as a basis for adjusting the histogram equalization correction intensity of luminance correction.

Figure 10:
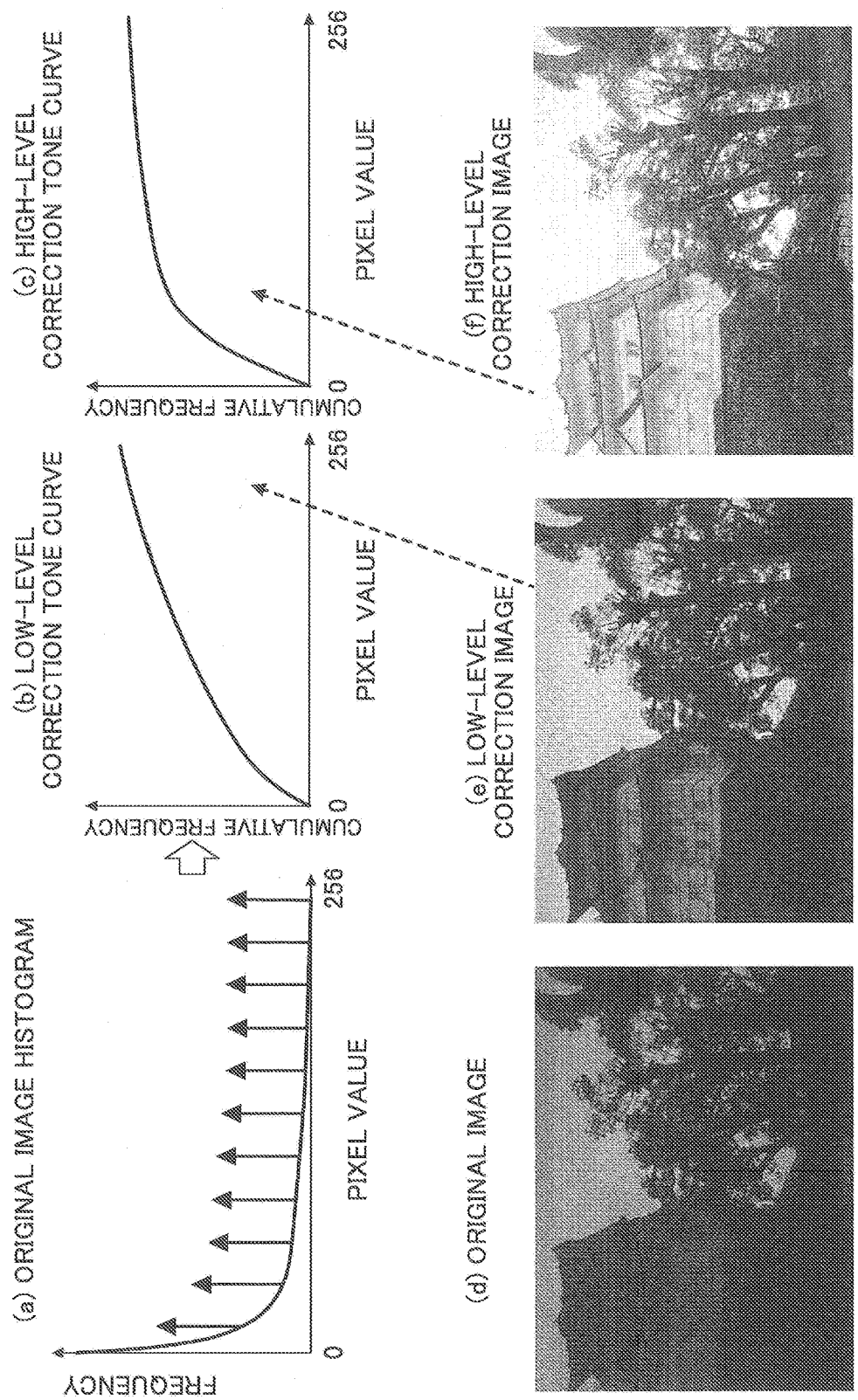
FIG. 10 illustrates tone curve conversion examples using a cumulative histogram having an offset added thereto as a lookup table and image correction examples.

FIG. 10 illustrates example offset-adjusted equalization tone curves created based on cumulative histograms having an offset added thereto and example correction images.

In the present example, the histogram equalization correction intensity level of an output image can be selectively set up by a user.

By adding a uniform offset to a histogram of content, the concentration (deviation) of the histogram is dispersed so that unevenness of the cumulative histogram is reduced to be closer to a straight line.

By adjusting the amount of offset added, the intensity level of luminance correction can be controlled by the user.

The luminance image correction unit 3 adds a predetermined amount of offset to a histogram according to the correction intensity level set up by the user except when the highest correction intensity level is set up by the user. Note that the amount of offset added to the histogram increases as the correction intensity level decreases.

TABLE 2

| LUMINANCE CORRECTION INTENSITY LEVEL | LOW | MEDIUM | HIGH |
|---|---|---|---|
| OFFSET AMOUNT | LARGE OFFSET AMOUNT | SMALL OFFSET AMOUNT | NO OFFSET |

For example, the histogram equalization correction intensity level may be divided into levels "low", "medium", and "high" as indicated above in TABLE 2, and the histogram equalization intensity (maximum intensity) can be adjusted according to the correction intensity level that has been selectively set up by the user.

Specifically, the luminance image correction unit 3 adds a predetermined amount of offset to a histogram, creates an offset-adjusted cumulative histogram based on the histogram having the offset added thereto, and performs histogram equalization using (referring to) the offset-adjusted cumulative histogram that has been normalized to the number of bits in the luminance signal as a lookup table.

When an offset is added to the histogram as described above, the histogram equalization correction intensity of a luminance-corrected image can be adjusted to be within the correction intensity level that has been selectively set up by weighting the mix ratio of the offset-adjusted equalization tone curve and the non-processing tone curve based on a determination value (count value) to synthesize a correction tone curve as illustrated in FIG. 9, for example.

<Image Processing Apparatus Configuration>

Figure 11:
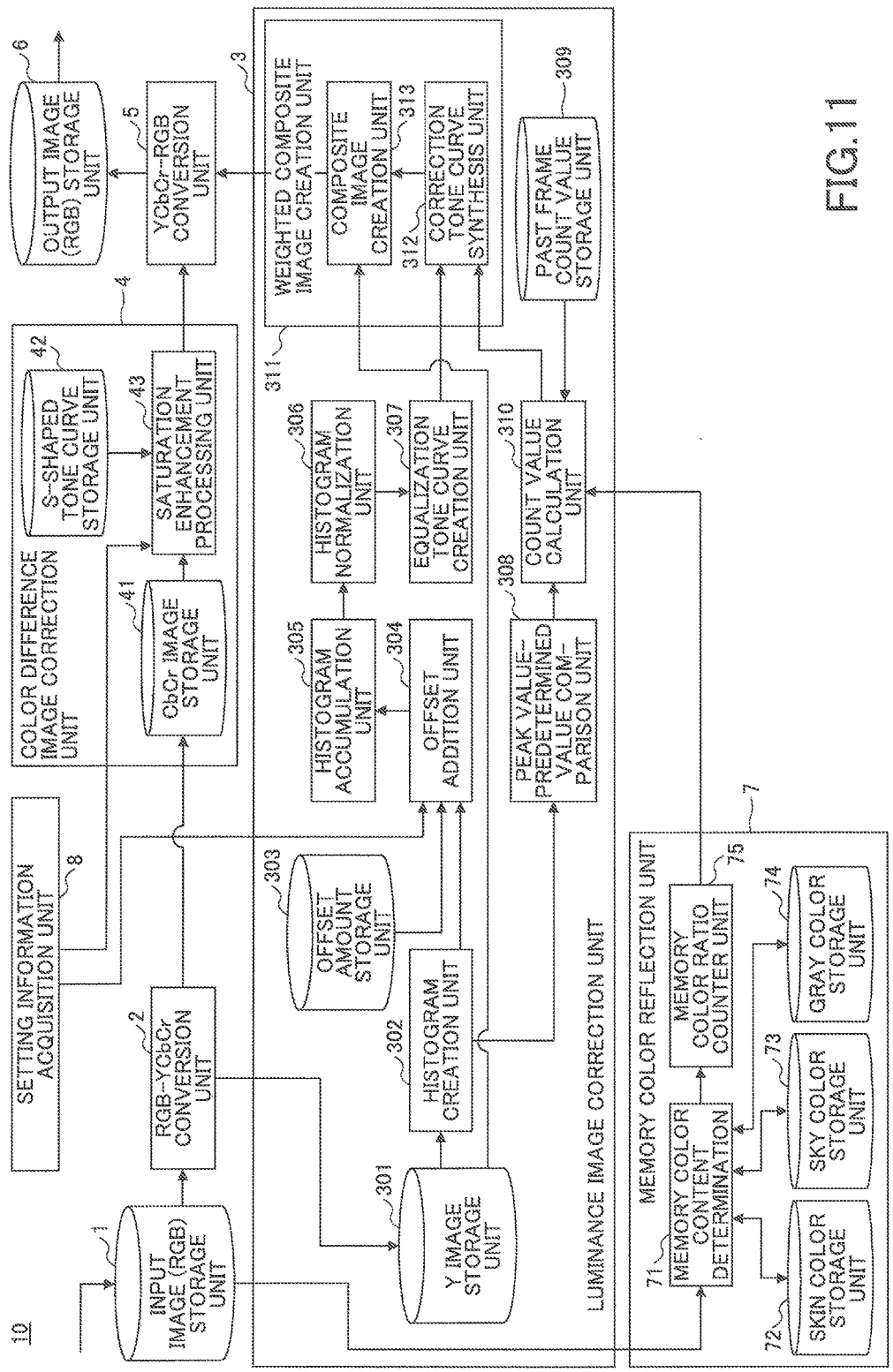
FIG. 11 is a block diagram illustrating an example functional configuration of the image processing apparatus according to the first control example of the present invention.

FIG. 11 is a block diagram illustrating an example functional configuration of the image processing apparatus 10 according to an embodiment of the present invention that is capable of executing the control operations illustrated in FIG. 9.

The image processing apparatus 10 according to the present embodiment includes the input image (RGB) storage unit 1, the RGB-YCbCr conversion unit 2, the luminance image correction unit 3, the color difference image correction unit 4, the YCbCr-RGB conversion unit 5, the output image (RGB) storage unit 6, the memory color reflection unit 7, and the setting information acquisition unit 8.

The luminance image correction unit 3 includes a Y image storage unit 301, a histogram creation unit 302, an offset amount storage unit 303, an offset addition unit 304, a histogram accumulation unit 305, a histogram normalization unit 306, and an equalization tone curve creation unit 307 that are used for histogram equalization.

Also, the luminance image correction unit 3 includes a peak value-predetermined value comparison unit 308, a past frame count value storage unit (past frame determination value storage unit) 309, a count value calculation unit 310, and a weighted composite image creation unit 311. The weighted composite image creation unit 311 includes a correction tone curve synthesis unit 312 and a composite image creation unit 313.

The color difference image correction unit 4 includes a CbCr image storage unit 41, a tone curve storage unit 42, and a saturation enhancement processing unit 43.

The memory color reflection unit 7 includes a memory color content determination unit 71, a skin color storage unit 72, a sky color storage unit 73, a gray color storage unit 74, and a memory color ratio counter unit 75.

In the luminance image correction unit 3, the histogram creation unit 302 creates a histogram (luminance histogram) as illustrated in FIG. 5, for example, based on a Y image stored in the Y image storage unit 301.

The offset addition unit 304 determines an offset amount corresponding to the correction intensity level acquired by the setting information acquisition unit 8 and adds the offset amount to the histogram.

The histogram accumulation unit 305 creates a cumulative histogram based on a luminance histogram as illustrated in FIG. 5, for example.

The histogram normalization unit 306 performs histogram normalization using the cumulative histogram (FIG. 5) as a lookup table, and the equalization tone curve creation unit 307 creates an equalization tone curve (FIG. 6).

Alternatively, when the histogram equalization correction intensity level is set to a low level, the histogram normalization unit 306 and the equalization tone curve creation unit 307 may create an offset-adjusted equalization tone curve as illustrated in FIG. 10 using an offset-adjusted cumulative histogram as a lookup table.

Also, the peak value-predetermined value comparison unit 308 determines whether the peak value of the histogram of a current image (frame) exceeds the predetermined peak value, or the peak value-predetermined value comparison unit 308 calculates the ratio of frequencies exceeding a predetermined value (i.e., ratio of highly occurring luminance values occurring at a frequency greater than or equal to the predetermined value with respect to all the luminance values) as illustrated in FIG. 7 and determines whether the correction intensity of histogram equalization with respect to the histogram is to be increased or decreased. That is, the peak value-predetermined value comparison unit 308 functions as an equalization on/off determination unit.

The count value calculation unit (frame counter) 310 reads an immediately preceding count value stored in the past frame count value storage unit 309 and increases/decreases the count value based on the determination made by the peak value-predetermined value comparison unit 308. That is, the count value calculation unit (frame counter) 310 increases the count value when the correction intensity of the histogram equalization process is to be increased, and decreases the count value when the correction intensity of the histogram equalization process is to be decreased. Note that the count value is an example of a determination value, and as such, the count value calculation unit 310 functions as a determination value calculation unit.

The weighted composite image creation unit 311 creates a composite image based on a correction tone curve that has been synthesized by combining a non-processing toner curve (diagonal straight line) and the equalization tone curve created by the equalization tone curve creation unit 307 using a weighting coefficient represented by the count value.

Note that process operations implemented by the memory color reflection unit 7 for processing a memory color will be described in detail below with reference to FIG. 13.

In the color difference image correction unit 4, the saturation enhancement processing unit 43 applies a correction tone curve (S-shaped tone curve) that is stored in the tone curve storage unit 42 to a CbCr image that is stored in the CbCr image storage unit 41 to create a saturation-enhanced image as illustrated in FIG. 4, for example.

<Control Flow>

Figure 12:
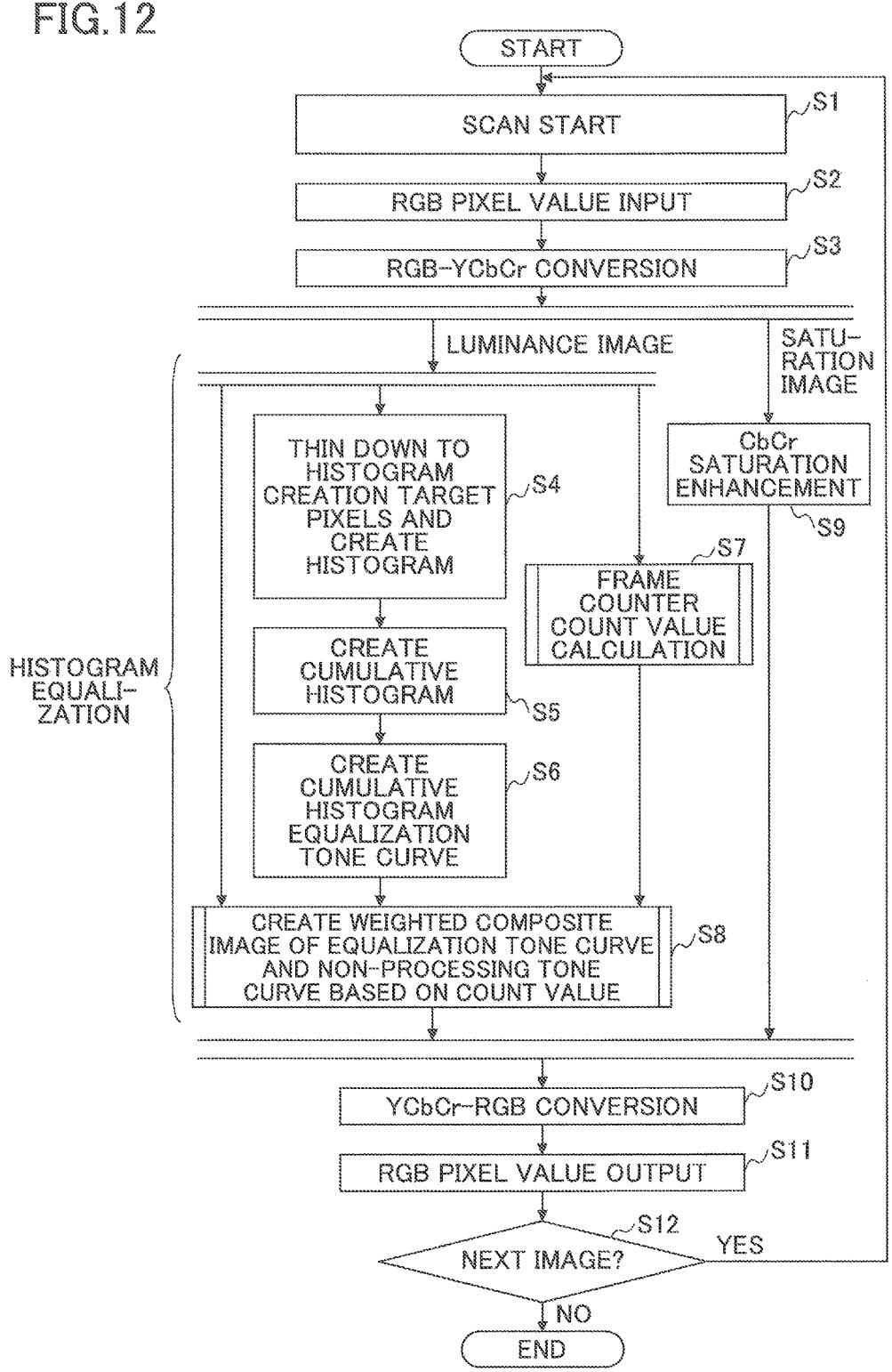
FIG. 12 is a flowchart illustrating an image processing procedure according to the first control example of the present invention.

FIG. 12 is a flowchart illustrating an example image processing operation according to an embodiment of the present invention.

In step S1, the image processing apparatus 10 starts a scanning operation.

In step S2, RGB pixel values of an input image (RGB image) are input and stored in the input image storage unit 1.

In step S3, the RGB-YCbCr conversion unit 2 converts the RGB image to a YCbCr image. After step S3, the luminance (Y) image (original image) and the color difference (CbCr) image are separately processed in parallel.

The luminance image created in step S3 is used in a histogram creation process of step S4, a count value calculation process of step S7, and a composite image creation process of step S8.

In step S4, the histogram creation unit 302 thins down the luminance image to histogram creation target pixels.

In step S5, the histogram accumulation unit 305 creates a cumulative histogram based on a histogram or a histogram to which an offset is added.

In step S6, the equalization tone curve creation unit 307 creates an equalization tone curve using the cumulative histogram or offset-adjusted cumulative histogram as a lookup table.

In step S7, the count value calculation unit 310 calculates the count value of the frame counter. Note that the calculation process implemented by the frame counter will be described in detail below with reference to FIG. 13.

In step S8, the weighted composite image creation unit 311 uses the count value as a weighting coefficient to create a composite image (Y image) by weighting and combining the luminance image (original image) and a histogram-equalized image using a tone curve.

Further, in parallel with steps S4 to S8, in step S9, a saturation-enhanced image is created based on the color difference (saturation) image.

In step S10, the YCbCr-RGB conversion unit 5 combines the luminance-corrected image (Y image) corresponding to the composite image created in step S8 and the color-difference-corrected image (CbCr) corresponding to the saturation-enhanced image, and converts the combined image into an output RGB image.

In step S11, an output RGB image (output image signal) is output from the output image (RGB) storage unit 6.

Note that the image processing operation according to the present embodiment as illustrated in FIG. 12 can be used in combination with other image processing techniques. For example, the image processing operation of FIG. 12 may be used in combination with pixel shifting (wobulation), which is a powerful technique for increasing the effective resolution of a projector to 4K or 8K, for example.

For example, in the case of outputting a 4K image by pixel shifting in two directions (when there are shift positions α and β), by applying the image processing algorithm according to the present embodiment to each of the shift positions α and β, memory usage may be reduced as compared with the case of applying the algorithm to the 4K image itself.

Note that by implementing image processing control according to the present embodiment in conjunction with pixel shifting, higher resolution and HDR (visual appeal) may be achieved at the same time, for example.

<Counting Method>

Figure 13:
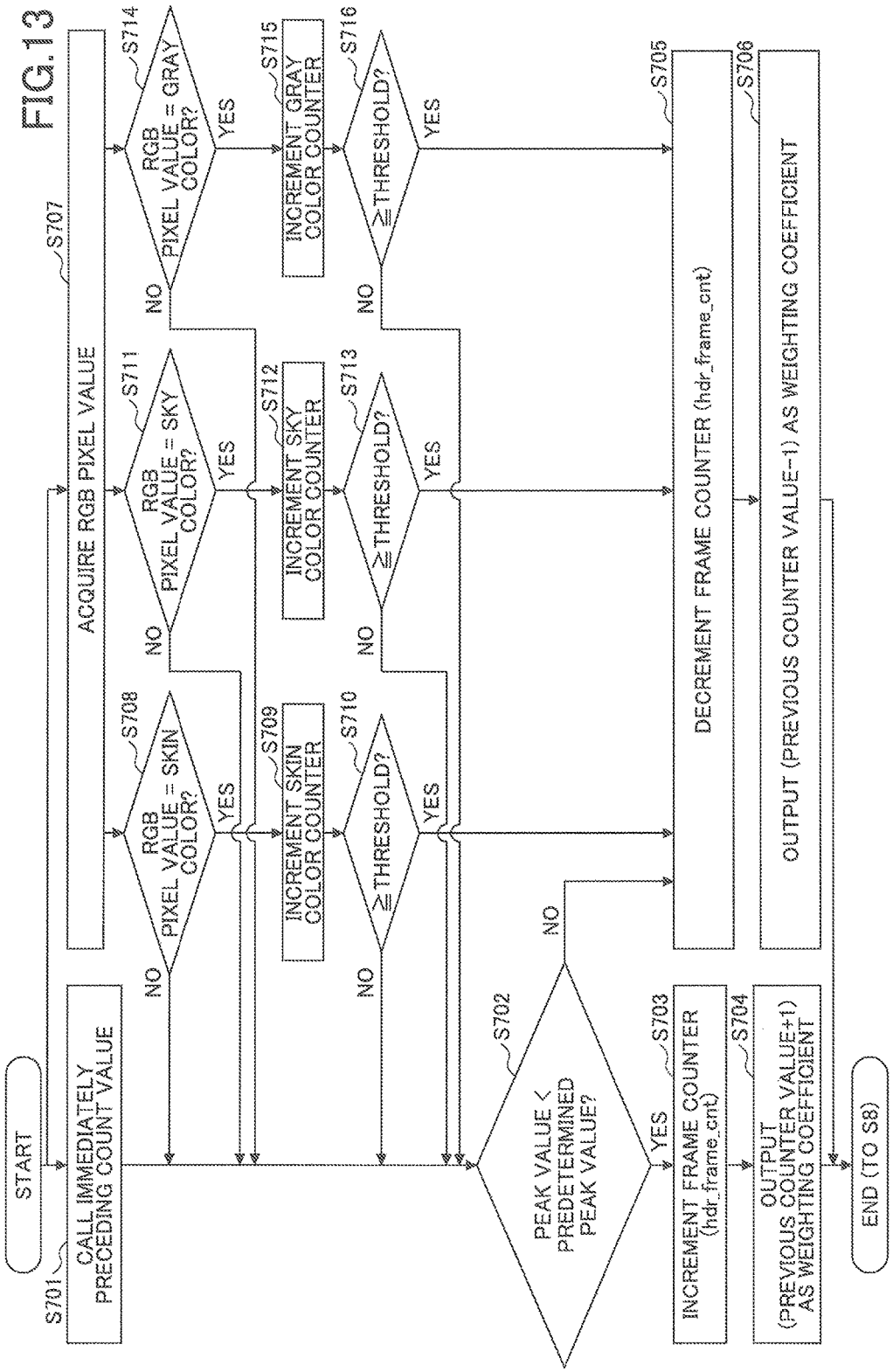
FIG. 13 is a flowchart illustrating a calculation procedure implemented by a frame counter.

FIG. 13 is a flowchart illustrating an example calculation process implemented by the frame counter (count value calculation unit 310). Note that the calculation process of FIG. 13 corresponds to step S7 of FIG. 12.

First, a basic flow for implementing a weighted transition in which the histogram equalization correction intensity is gradually changed as illustrated in FIG. 8 will be described.

In step S701, the count value calculation unit 310 calls an immediately preceding count value stored in the past frame count value storage unit 309.

In step S702, the peak value-predetermined value comparison unit 308 determines that a histogram of a target frame is continuous if the peak value of the histogram is less than a predetermined peak value, and determines that the histogram is discrete if the peak value is greater than or equal to the predetermined peak value. Alternatively, the peak value-predetermined value comparison unit 308 may calculate the ratio of frequencies exceeding a predetermined value (highly occurring pixel values) and determine whether the calculated ratio is greater than or equal to a predetermined ratio. Note that in the present embodiment, it is assumed that the predetermined peak value is greater than the predetermined value used as a threshold for calculating the above ratio.

When it is determined in step S702 that the peak value is less than the predetermined peak value or that the ratio of frequencies exceeding the predetermined value is greater than or equal to the predetermined ratio (YES in step S702), the peak value-predetermined value comparison unit 308 determines that the histogram of the original image is continuous and the process proceeds to step S703. In step S703, the count value of the frame counter is incremented to increase the histogram equalization correction intensity, and in step S704, the frame counter outputs the incremented count value (previous count value+1) as a weighting coefficient.

When it is determined in step S702 that the peak value is greater than or equal to the predetermined peak value or the ratio is less than the predetermined ratio (NO in step S702), the histogram of the original image is determined to be discrete, and the process proceeds to step S705. In step S705, the counter value of the frame counter is decremented to decrease the histogram equalization correction intensity, and in step S706, the decremented count value (previous count value −1) is output as a weighting coefficient.

After the count value calculation process is completed, the process proceeds to the composite image creation process implemented by the weighted composite image creation unit 311 (step S8 of FIG. 12).

Note that steps S701 to S706 are basic counting processes for gradually changing the correction intensity as illustrated in FIG. 8. In a further embodiment, the count value setting may be adjusted based on count values of memory colors.

<Adjustment by Memory Color>

Skin color, sky color, and green color are referred to as memory colors and are known to leave a strong impression on a viewer. The above-described histogram equalization process can substantially improve the clarity of an image, but when there is noise in the image, noise may also be emphasized.

Block noise and mosquito noise that occur when compressing an image into MPEG (Moving Picture Experts Group) are examples of noise often contained in video.

When histogram equalization is applied to an image, block noise and/or mosquito noise may also be emphasized. When noise is emphasized in a skin color image portion or a sky color image portion of a moving image, the visual impression of the moving image may be particularly prone to degradation.

In this respect, when performing histogram equalization on/off determination with respect to a frame, the content ratios of skin color and sky color corresponding to memory colors and gray color for which viewers tend to have high visual sensitivity are used as criteria for the determination. That is, when the content ratio of at least one of the above colors is higher than a threshold ratio, the count value of the frame counter is decremented regardless of the determination result of step S702 so that histogram equalization may be gradually transitioned to off mode to avoid unwanted noise emphasis in the skin color portion or sky color portion, for example.

In step S707, the memory color content determination unit 71 records, in the skin color storage unit 72, the RGB pixel values that are used for determining whether the color of a pixel of an RGB image corresponding to an input image of each frame corresponds to the skin color.

Then, in S708, the RGB pixel values recorded in the skin color storage section 72 are called. Based on the RGB pixel values, it is determined whether a corresponding pixel is the skin color (whether the pixel values correspond to the skin color). If it is determined that the pixel values do not correspond to the skin color (NO in step S708), a skin color counter is not incremented.

If it is determined that the pixel values correspond to the skin color (YES in step S708), the process proceeds to step S709 and the skin color counter is incremented.

More specifically, a skin color count value "skin_counter" counting the number of skin color pixels, a sky color count value "sky_counter" counting the number of sky color pixels, and a gray color count value "gray_counter" counting the number of gray color pixels are used as determination values.

For example, to count the number of skin color pixels, the RGB pixel values (10 bits) of a pixel are referenced, and if the pixel value of R (red) is at least 1.2 times the pixel value of G (green) and at least 1.4 times the pixel value of B (blue) and if the pixel value of R (red) is greater than 255 (/1023), the pixel is regarded as a skin color pixel, and the skin color count value "skin_counter" is incremented.

$$\text{if}(in\_r > (in\_g * 1.2) \,\&\&\, in\_r > (in\_b * 1.4) \,\&\&\, in\_r > 255) \\ skin\_counter++;$$

(16)

If it is determined in step S710 that the skin color count value "skin_counter" is greater than or equal to a threshold, i.e., if the ratio of skin color pixels included in the input image is greater than or equal to a threshold ratio, the process proceeds to step S705 and the count value of the frame counter (count value calculation unit 310) is decremented irrespective of the determination result of step S702.

Note that determination processes with respect to sky color pixels implemented in steps S711 to S713 may be substantially identical to the determination processes with respect to skin color pixels implemented in S708 to S710 as described above, and the determination processes of steps S711 to S713 are executed in parallel with the determination processes of steps S708 to S710.

For example, to count the number of sky color pixels, the RGB pixel values (10 bits) of a pixel are referenced, and if the pixel value of B (blue) is at least 1.2 times the pixel value of G (green) and at least 1.2 times the pixel value of R (red) and if the pixel value of B (blue) is greater than 511 (/1023), the pixel is determined as a sky color pixel, and the sky color count value "sky_counter" is incremented.

$$\text{if}(in\_b > (in\_g * 1.2) \,\&\&\, in\_b > (in\_r * 1.2) \,\&\&\, in\_b > 511) \\ sky\_counter++;$$

(17)

Furthermore, determination processes with respect to gray color pixels implemented in steps S714 to S716 may be substantially identical to the determination processes with respect to skin color pixels implemented in steps S708 to S710 and the determination processes with respect to sky color pixels implemented in steps S711 to S713, and the determination processes with respect to the gray color pixels are executed in parallel with the determination processes with respect to the skin color pixels and the sky color pixels.

For example, to count the number of gray color pixels, the RGB pixel values (10 bits) of a pixel are referenced, and if the pixel value of R (red) is ±10 the pixel value of B (blue), the pixel value of G (green) is ±10 the pixel value of B (blue), and the pixel value of B (blue) is greater than 511 (/1023), the pixel is determined as a gray color pixel, and the gray count value "gray_counter" is incremented.

When at least one of the cumulative values of the above memory color count values "skin_counter", "sky_counter", and "gray_counter" exceeds a predetermined value, the histogram equalization correction level is decreased by decrementing the count value of the frame counter to reduce noise emphasis.

$$\begin{aligned}&\text{if(hist\_peak} > ((\text{xsize} * \text{ysize}) >> \text{bit\_shift\_num}) \,\|\, \text{hist\_peak\_add} > \\&(1023 * 0.9) \,\| \\&\text{sky\_counter} > (\text{xsize} * \text{ysize}) >> \text{bit\_shift\_sky} \,\|\, \text{skin\_counter} > \\&(\text{xsize} * \text{ysize}) >> \\&\text{bit\_shift\_skin})\end{aligned} \quad (18)$$

By implementing such control, even when a natural image and a binary image are switched back and forth, for example, the image processing apparatus 10 may be able to adjust the histogram equalization correction intensity of each frame of a moving image according to the image content of each frame such that a viewer will be less likely to sense some awkwardness in the processed image.

<Second Control Example>

The above-described first control example may be particularly effective when a drastic change in image content occurs, such as a switch between a natural image as illustrated at the top of FIG. 7 and a binary image as illustrated at the bottom of FIG. 7, and the switched image is retained for a certain period of time, for example.

However, if a change in image content of a moving image occurs relatively quickly (e.g., when image content suddenly changes to a different scene), the frame-by-frame gradual transition of the histogram equalization correction intensity as described above may not always be suitable. That is, an optimal histogram equalization correction intensity for a scene before a sudden change occurs may continue to be used after the sudden change in scene occurs even though the correction intensity is not optimal for the scene after the sudden change (e.g., image correction may not be able to keep up with the sudden change).

Also, even when a moving image is a continuous succession of similar scenes, fine variations in the histogram equalization correction intensity may occur, which may lead to visually unpleasant flickering, for example.

In this respect, according to a second control example, luminance correction control may be adjusted according to the type of content of a moving image as described below.

According to the second control example, the histogram equalization correction intensity is clipped at a predetermined threshold. That is, a luminance image correction unit 3A that implements the second control example adjusts the histogram equalization correction intensity for each frame such that the histogram equalization correction intensity calculated for each frame of a luminance image based on the content is within a predetermined range.

FIGS. 14A-14C illustrate a basic concept of the second control example. FIG. 14A is a graph representing a correspondence equation between a histogram and an equalization intensity. FIG. 14B illustrates clipping of the equalization intensity, and FIG. 14C illustrates an example of luminance adjustment for a dark scene.

According to the second control example, when the equalization intensity that is calculated based on the peak value of the histogram of a luminance image (frame) exceeds a brighter direction threshold or a darker direction threshold, the equalization intensity is clipped at the brighter direction threshold or the darker direction threshold so that the equalization intensity does not exceed the brighter direction threshold or the darker direction threshold. That is, the correction intensity calculated for a predominantly dark frame or a predominantly bright frame is adjusted such that the correction intensity may be controlled to be within the brighter direction threshold or the darker direction threshold.

Note that a functional configuration for implementing the second control example will be described in detail below with reference to FIG. 15.

Referring to the graph of FIG. 14B, when the equalization intensity calculated based on the peak value of the histogram of a frame exceeds the brighter direction threshold, i.e., when the frame is a predominantly dark frame, the equalization intensity is corrected so that it falls within the brighter direction threshold corresponding to the limit of the brighter direction correction intensity.

Also, in the graph of FIG. 14B, when the equalization intensity calculated based on the peak value of the histogram of a frame goes beyond the darker direction threshold value (is below the darker direction threshold in the graph of FIG. 14B), i.e., when the frame is a predominantly bright frame, the equalization intensity is corrected so that it falls within the darker direction threshold corresponding to the limit of the darker direction correction intensity.

By implementing such control, when the brightness or darkness of an original image, i.e., the peak value of the histogram of a luminance image signal excessively fluctuates, the equalization intensity may be adjusted to be within the brighter direction threshold or the darker direction threshold so that the histogram equalization correction intensity falls within a certain range. In this way, the histogram equalization intensity may be stabilized, suitable adjustments may be with respect to a sudden on/off transition, flickering that occurs when the image brightness suddenly changes may be reduced, and an undesirable viewer experience can be reduced, for example.

Note that in the adjustment example of FIG. 14C, by clipping the histogram equalization correction intensity for a luminance image signal of a predominantly dark frame representing a dark scene to be within the brighter direction threshold, the upper limit and the lower limit of the luminance value may also be clipped and flickering may be reduced as a result, for example.

Note that the second control example is for implementing quick operations with respect to each frame, and as such, in the second control example, the histogram equalization correction intensity is not cumulatively changed as in the first control example. Instead, the histogram equalization correction intensity for each frame is controlled (clipped) to be less than or equal to the brighter direction threshold or the darker direction threshold as illustrated in FIG. 14B.

Figure 15:
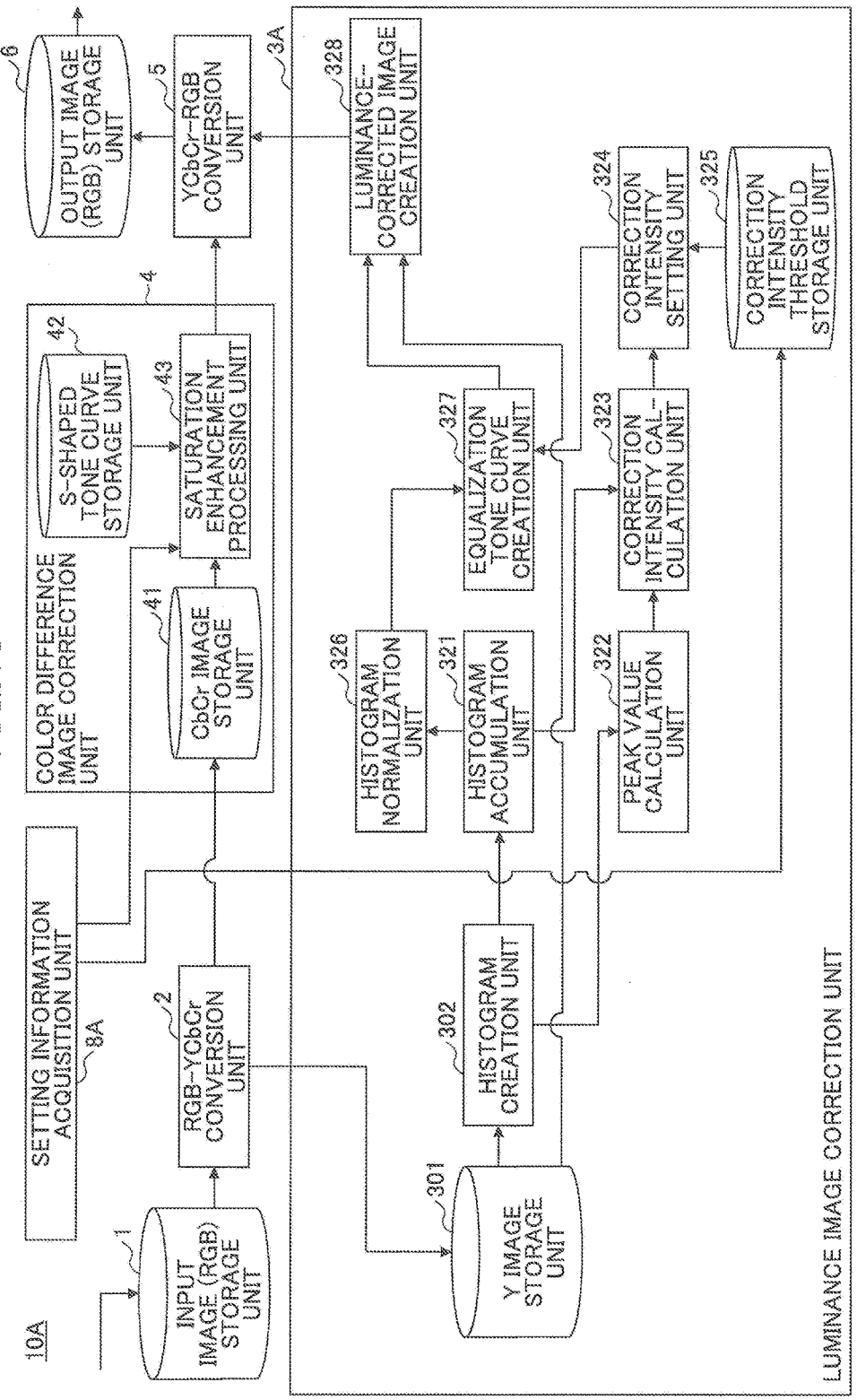
FIG. 15 is a block diagram illustrating an example functional configuration of the image processing apparatus according to the second control example of the present invention.

FIG. 15 is a block diagram illustrating an example functional configuration of an image processing apparatus 10A according to the second control example of the present invention. Note that features of the image processing apparatus 10A according to the second control example that may be substantially identical to those of the image processing apparatus 10 according to the first control example as illustrated in FIG. 11 are given the same reference numerals and their descriptions may be omitted. In the following, features of the image processing apparatus 10A that differ from those of the image processing apparatus 10 will be described.

In FIG. 15, the image processing apparatus 10A according to the second control example includes the luminance image correction unit 3A, which includes the Y image storage unit 301, the histogram generation unit 302, a histogram accumulation unit 321, a peak value calculation unit 322, a correction intensity calculation unit 323, a correction intensity setting unit 324, a correction intensity threshold storage unit 325, a histogram normalization unit 326, an equalization tone curve generation unit 327, and a luminance correction image generation unit 328.

The histogram accumulation unit 321 accumulates a histogram of the luminance image (signal) of each frame. Based on the cumulative result, the histogram accumulation unit 321 determines whether to correct the luminance image in the brighter direction or in the darker direction.

The peak value calculation unit 322 detects a peak in a histogram and calculates the peak value of the histogram.

Based on the calculated peak value of the histogram, the correction intensity calculation unit 323 calculates the equalization intensity based on the relational equation of FIG. 14A. FIG. 14A represents the correspondence equation (relational equation) indicating the correspondence between the histogram peak value and the equalization intensity. It is assumed that the relational equation of FIG. 14A is embedded in the image processing apparatus (circuit) 10A in advance, for example.

According to the relational equation of FIG. 14A, the smaller the peak value of the histogram, the higher the corresponding equalization intensity. Also, when the peak value of the histogram exceeds a predetermined value, the equalization intensity of the histogram becomes zero.

For example, the histogram of an image, such as a photograph or an illustration, often has a relatively low peak value, and as such, a relatively high equalization intensity is calculated as the corresponding equalization intensity for the image based on the relational equation of FIG. 14A.

On the other hand, the histogram of a text image, such as a Word or Excel document (see, e.g., bottom image of FIG. 7), has a relatively high peak value, and as such, the corresponding equalization intensity based on the relational equation of FIG. 14A is zero (0), i.e., histogram equalization is not performed.

Note that the correction intensity calculation unit 323 also acquires correction direction information relating to the correction direction (brighter direction or darker direction) of the luminance image that is determined by the histogram accumulation unit 321 based on the cumulative histogram and outputs the acquired correction direction information together with the calculated correction intensity to the correction intensity setting unit 324.

The correction intensity threshold storage unit 325 sets correction intensity thresholds, including the brighter direction threshold for correcting the equalization intensity in the brighter direction and the darker direction threshold for correcting the equalization intensity in the darker direction as illustrated in FIG. 14B, for example. Note that the correction thresholds may be arbitrarily set by the user and acquired by a setting information acquisition unit 8A, or the correction thresholds may be set up in advance at the time of manufacture, for example. Also, note that the intensity of the brighter direction threshold and the intensity of the darker direction threshold may be the same or different.

The correction intensity setting unit 324 compares the correction intensity calculated by the correction intensity calculation unit 323 with the brighter direction threshold for the correction intensity and the darker direction threshold for the correction intensity stored in the correction intensity threshold storage unit 325. If the calculated correction intensity is within the brighter direction threshold and the darker direction threshold (i.e., does not exceed the brighter direction threshold and the darker direction threshold), the calculated correction intensity is set up as the correction intensity for the luminance image without further correction.

On the other hand, when the equalization intensity corresponding to the histogram peak value calculated based on the luminance image signals of a dark frame goes beyond the brighter direction threshold, the correction intensity setting unit 324 sets the equalization intensity for this frame to the brighter direction threshold.

Also, when the equalization intensity corresponding to the histogram peak value calculated based on the luminance image signals of a bright frame goes beyond the darker direction threshold, the correction intensity setting unit 324 sets the equalization intensity for this frame to the darker direction threshold.

The histogram normalization unit 326 creates a cumulative histogram that is normalized to the number of bits in the luminance image signals.

The equalization tone curve creation unit 327 uses (refers to) the normalized cumulative histogram as a lookup table and creates an equalization tone curve for implementing histogram equalization at the equalization intensity set up by the correction intensity setting unit 324.

The luminance correction processing unit 328 performs a histogram equalization process on the luminance image using the equalization tone curve to create a luminance-corrected image.

Then, in a manner similar to the first control example, the YCbCr-RGB conversion unit 5 combines the generated luminance-corrected image (Y) and the color-difference-corrected image (CbCr) that has undergone saturation enhancement and converts the combined image into an output RGB image.

Thereafter, the image processing apparatus 10A outputs the output RGB image from the output image (RGB) storage unit 6.

By implementing such control, even when a moving image includes natural images that changes relatively quickly, for example, the image processing apparatus 10A can prevent flickering of the screen to avoid giving a visually awkward impression to a viewer and adjust the histogram equalization correction intensity of a moving image, frame-by-frame.

Note that although the first control example and the second control example have been described separately, the above two control examples may be alternatively selected or executed in combination.

More specifically, according to one aspect of the present invention, a luminance image correction unit can correct a moving image to be projected, based on the type of content of the moving image, by implementing a selected one of or a combination of the following luminance correction processes.

(1) Luminance correction that involves gradually changing a determination value, which is associated with a histogram equalization correction intensity of a luminance-corrected image signal to be created and is obtained for each frame of consecutive frames of a moving image signal, and adjusting the histogram equalization correction intensity for each frame based on the determination value.

(2) Luminance correction that involves calculating a histogram equalization correction intensity of a luminance-corrected image signal for each frame to be created based on the peak value of the histogram of the frame and clipping the histogram as necessary.

For example, as described above with reference to FIG. 13, an upper threshold is set up for each of the skin color count value (skin_counter), the sky color count value (sky_counter), and the gray color count value (gray_counter) of the memory color ratio counter unit 75, and the histogram equalization correction intensity is decremented when the count value exceeds the upper limit threshold. In a further embodiment, when the counter value exceeds the upper limit threshold, the counter value may be clipped to the upper limit threshold, for example. In this way, the histogram equalization correction intensity may be stabilized and screen flickering can be prevented.

Image processing control according to embodiments of the present invention as described above may be implemented in all types of video devices. For example, image processing control according to embodiments of the present invention may be effectively implemented in a DLP projector, which is an example of an image projection apparatus having restrictions in implementation and change of hardware resources, such as an FPGA (Field-Programmable Gate Array) and an ASIC (application specific integrated circuit).

<Application to Color Wheel>

Figure 16A:
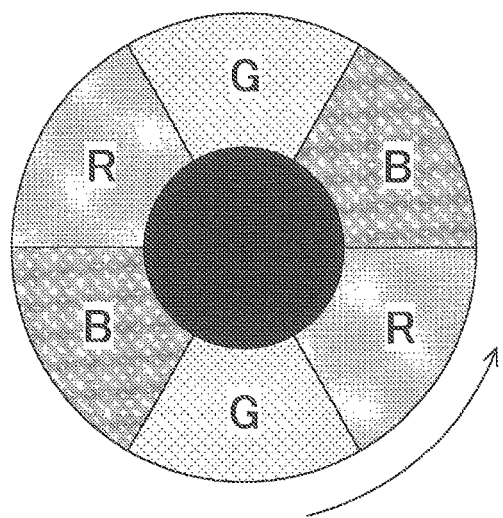
FIGS. 16A and 16B are example color wheels of a DLP projector.
Figure 16B:
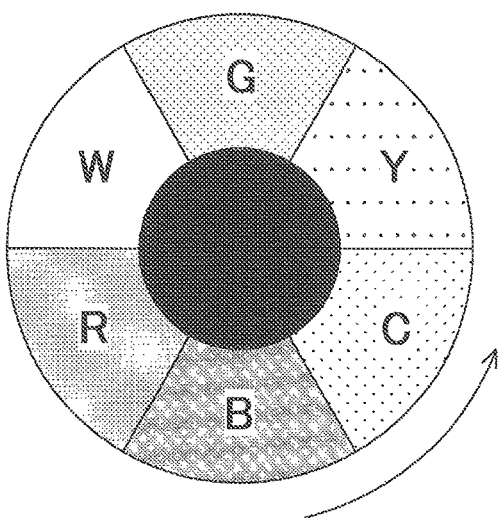

FIGS. 16A and 16B illustrate example color wheels of a DLP projector. FIG. 16A illustrates an example configuration of a color wheel in which fan-shaped color separation filters of RGB colors are sequentially arranged on a disk. FIG. 16B illustrates another example configuration of a color wheel in which color separation filters for RGB colors, C (cyan), Y (yellow), and W (white) are sequentially arranged.

A DLP projector 20 as illustrated in FIG. 17 displays a color through time division color mixing by rotating a color wheel having color filters of RGB primary colors such as that illustrated in FIG. 16A at a high speed. In color display scheme, use efficiency of the primary colors is lower as compared with general displays and liquid crystal projectors, and when projected in a raw state, the color tends to be darkened. Thus, image processing control according to an embodiment of the present invention is preferably implemented in such the DLP projector 20.

Also, note that because the color wheel illustrated in FIG. 16B is provided with color separation filters for cyan and yellow, it may be easier to reproduce yellow and light blue color reproduction regions when using such color wheel as compared with the color wheel of FIG. 16A, for example.

As such, in setting the saturation enhancement correction intensity level for a color difference image as described above with reference to FIG. 4 and TABLE 1, for example, when the color wheel with RGB color filters as illustrated in FIG. 16A is used, the saturation enhancement correction intensity level may be set to a higher level, and when the color wheel with RGB, CY, and W color filters as illustrated in FIG. 16B is used, the saturation enhancement correction intensity level may be set to a lower level, for example.

<Application to DLP Projector>

FIG. 17 is a block diagram illustrating an example configuration of the DLP projector (image projection apparatus) 20 to which an image processing method according to an embodiment of the present invention can be applied.

In the example configuration of FIG. 17, the DLP projector 20 includes an input I/F 201, an operation panel 213, a DLP controller 210, a ROM 215, a RAM 216, a speaker 221, a light emitting device 231, a color wheel 233, and a DMD (Digital Mirror Device) 235.

Note that the DLP controller 210 is an example of a control unit, and the light emitting device 231, the color wheel 233, and the DMD 235 are examples of a projection unit.

The input I/F 201 has input interfaces, such as a LAN controller 202, an AFE (Analog Front End) 203, an HDMI (registered trademark) 204, and a USB 205, for example.

The operation panel 213 and the remote controller 214 that is capable of communicating with the DLP projector 20 are configured to notify the DLP controller 210 of various operation inputs made by the user.

The communication unit 223 wirelessly communicates with an external device, such as a PC or an electronic pen, and may be implemented by a wireless communication device.

The DLP controller 210 executes a program stored in the ROM 215 and uses the RAM 216 to control the various component units of the DLP projector 20.

The DLP controller 210 performs various image processing operations, such as gradation conversion processing, scaling, trapezoidal correction, with respect to a projection image input via the input I/F 201 and displays a partial projection image resulting from the image processing on the DMD 235. Further, the DLP controller 210 inter-connectedly performs various control operations, such as light emission control with respect to the light emitting device 231, rotation control with respect to the color wheel 233, display control with respect to the DMD 235, and audio output control with respect to the speaker 221, for example.

The light emitting device 231 may be implemented by a lamp and a ballast or an LED (Light Emitting Diode) light source, for example.

When the DLP controller 210 rotates the color wheel 233, the color wheel 233 separates the light source light from the light emitting device 231 into R, G, and B colors using a time-division color separation system and inputs monochromatic light of the R, G, and B colors onto the whole display area of the DMD 235.

Figure 18:
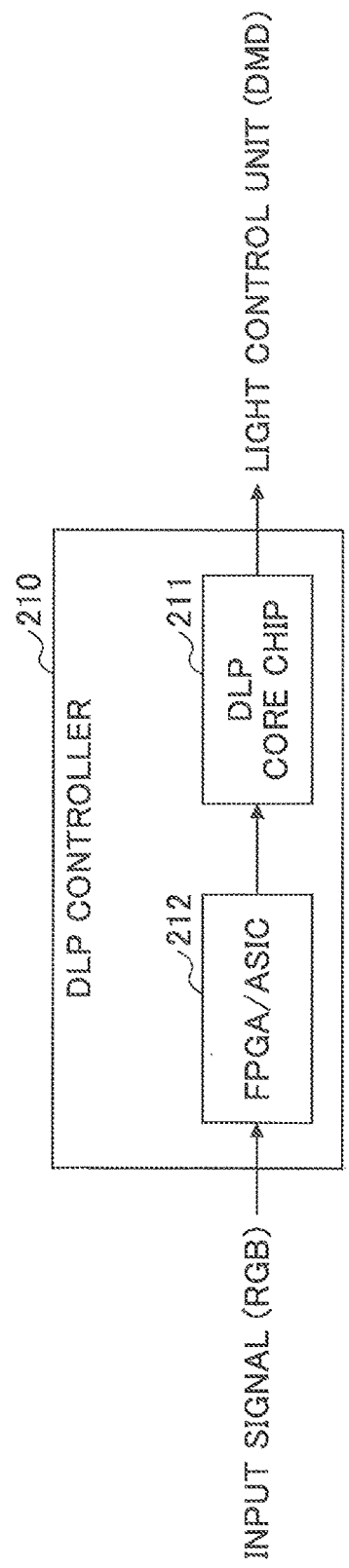
FIG. 18 is a block diagram illustrating an example configuration of a DLP controller of the DLP projector.

FIG. 18 illustrates an example configuration of the DLP controller 210.

An FPGA or an ASIC including a functional configuration capable of executing the above-described image processing method can be implemented with relative ease.

Accordingly, in FIG. 18, an FPGA or ASIC 212 is post-mounted in the DLP controller 210 at a stage before a DLP core chip 211 corresponding to a CPU, and in this way, HDR conversion by processing an image according to image content through gradation conversion processing may be implemented to improve image quality.

According to an aspect of the present embodiment, an image processing apparatus that is capable of enhancing the effects of HDR tone adjustment and adjusting the histogram equalization correction intensity for each frame of a moving image according to the image content without giving an awkward impression to a viewer may be implemented by hardware implementation at a relatively low cost using an FPGA or ASIC, for example.

Note that in the examples of FIGS. 17 and 18, an image processing apparatus according to an embodiment of the present invention is implemented by a DLP projector. However, the present invention is not limited to application to a DLP projector. For example, the present invention can also be applied to a video projector that reproduces a moving image, a projector, a video having a liquid crystal panel, a vehicle mounted camera, a video, a television, a personal computer, a tablet, a smartphone, a mobile phone, and the like Also, although YCbCr is described as an example of the luminance color difference signals, similar luminance color difference signals, such as YUV (Y: Lumina, U: Axis blue component, V: Axis red component), may also be used for conversion in a manner similar to that implemented with respect to YCbCr signals as described above.

Note that each of the functions of the above described embodiments may be implemented by one or more processing circuits or circuitry. A processing circuit or circuitry includes a programmed processor, as a processor includes circuitry. A processing circuit or circuitry also includes devices, such as an application specific integrated circuit (ASIC), a DSP (digital signal processor), a FPGA (field programmable gate array), and conventional circuit components arranged to perform the described functions.

Although the present invention has been described above with reference to certain illustrative embodiments, the present invention is not limited to these embodiments, and numerous variations and modifications may be made without departing from the scope of the present invention.

What is claimed is:

1. An image processing apparatus comprising:
a processor; and
a memory configured to store program instructions that cause the processor to:
  convert an input image signal of each frame of a moving image signal into a luminance image signal and a color difference image signal,
  implement a luminance image correction process for generating a luminance-corrected image signal by applying a histogram equalization process to the luminance image signal of each frame,
  implement a color difference image correction process for generating a color-difference-corrected image signal by applying a saturation enhancement process to the color difference image signal of each frame, and
  convert the luminance-corrected image signal and the color-difference-corrected image signal into an output image signal that is in the same format as the input image signal, wherein
  the luminance image correction process and the color difference image correction process are executed in parallel with respect to each frame; and
  a histogram equalization correction intensity of the histogram equalization process is adjusted with respect to each frame.

2. The image processing apparatus according to claim 1, wherein the program instructions further causes the processor to:
  determine whether to execute the histogram equalization process based on content of the luminance image signal of each frame of the moving image signal;
  gradually change a determination value obtained for each frame of a plurality of consecutive frames of the moving image signal by incrementing or decrementing the determination value within a predetermined range by a predetermined number when it is determined that the histogram equalization process is to be executed, the determination value being associated with the histogram equalization correction intensity of the luminance-corrected image signal to be generated;
  accumulate and store the determination value obtained for each frame within the predetermined range; and
  gradually change the histogram equalization correction intensity for one frame and an immediately preceding frame upon adjusting the histogram equalization correction intensity for each frame based on the determination value such that the histogram equalization process is gradually switched on/off over the plurality of consecutive frames.

3. The image processing apparatus according to claim 2, wherein the program further causes the processor to:
  create a histogram for each frame of the luminance image signal;
  create a cumulative histogram based on the histogram; and
  create an equalization tone curve by referring to the cumulative histogram;
  synthesize the equalization tone curve and a non-processing tone curve to create a correction tone curve, and generate the luminance-corrected image signal based on the correction tone curve; and
  adjust the histogram equalization correction intensity of the luminance-corrected image signal by weighting a mix ratio of the equalization tone curve to the non-processing tone curve based on the determination value upon synthesizing the correction tone curve.

4. The image processing apparatus according to claim 3, wherein
  a correction intensity level of the output image signal is selectively set up by a user from among a plurality of correction intensity levels; and
  the processor adds a predetermined offset amount to the histogram for each frame of the luminance image signal according to the selectively set correction intensity level except when a highest correction intensity level of the plurality of correction intensity levels is selectively set up by the user; and
  the predetermined offset amount added to the histogram increases as the correction intensity level decreases.

5. The image processing apparatus according to claim 4, wherein the program instructions further cause the processor to:
  add the predetermined offset amount to the histogram;
  create an offset-adjusted cumulative histogram based on the histogram having the predetermined offset amount added thereto;
  create an offset-adjusted equalization tone curve by referring to the offset-adjusted cumulative histogram that has been normalized to a number of bits in the luminance image signal;
  synthesize the offset-adjusted equalization tone curve and the non-processing tone curve to create the correction tone curve;
  generate the luminance-corrected image signal based on the correction tone curve; and
  adjust the histogram equalization correction intensity of the luminance-corrected image signal to be within the selectively set correction intensity level by weighting a mix ratio of the offset-adjusted equalization tone curve to the non-processing tone curve based on the determination value upon synthesizing the correction tone curve.

6. The image processing apparatus according to claim 2, wherein the program instructions further cause the processor to:
  increment the determination value when it is determined that the histogram equalization process is to be executed, and decrements the determination value when it is determined that the histogram equalization process is not to be executed.

7. The image processing apparatus according to claim 2, wherein the program instructions further cause the processor to:
  detect a content ratio of a memory color of the input image signal of each frame and reflect the content ratio of the memory color in a determination of whether to increase or decrease the histogram equalization correction intensity of the histogram equalization process.

8. The image processing apparatus according to claim 7, wherein the program instructions further cause the processor to:

invalidate the determination value obtained for one frame and changes the histogram equalization correction intensity for the one frame to be lower than the histogram equalization correction intensity for an immediately preceding frame when it is determined that the content ratio of the memory color in the one frame is greater than a predetermined threshold.

9. The image processing apparatus according to claim 1, wherein the program instructions further cause the processor to:
create a histogram for each frame of the luminance image signal;
detect a peak in the histogram for each frame and calculate a peak value of the histogram for each frame;
calculate, for each frame, the histogram equalization correction intensity for converting the luminance image signal of each frame, based on the peak value of the histogram for each frame;
store in advance a brighter direction threshold for correcting the histogram equalization correction intensity in a brighter direction and a darker direction threshold for correcting the histogram equalization correction intensity in a darker direction; and
set the histogram equalization correction intensity of the luminance-corrected image signal to be generated;
wherein when the peak value is calculated based on the luminance image signal of a dark frame and the histogram equalization correction intensity associated with the calculated peak value exceeds the brighter direction threshold, the processor adjustably sets the histogram equalization correction intensity of the luminance-corrected image signal to be within the brighter direction threshold; and
wherein when the peak value is calculated based on the luminance image signal of a bright frame and the histogram equalization correction intensity associated with the calculated peak value exceeds the darker direction threshold, the processor adjustably sets the histogram equalization correction intensity of the luminance-corrected image signal to be within the darker direction threshold.

10. The image processing apparatus according to claim 1, wherein the program instructions further cause the processor to:
selectively implement, based on a type of content of a moving image to be projected, at least one of
a first luminance correction that includes gradually changing a determination value, which is associated with a histogram equalization correction intensity of a luminance-corrected image signal to be created and is obtained for each frame of a plurality of consecutive frames of the moving image signal, and adjusting the histogram equalization correction intensity for each frame based on the determination value; and
a second luminance correction that includes creating a histogram for each frame of the luminance image signal, adjusting a histogram equalization correction intensity of the luminance-corrected image signal of each frame to be generated based on a peak value calculated from the histogram for each frame, and setting the histogram equalization correction intensity to be less than or equal to a brighter direction threshold and a darker direction threshold.

11. The image processing apparatus according to claim 1, wherein the program instructions further cause the processor to:
spatially thins down pixels of the luminance image signal of each frame to create a histogram for each frame.

12. The image processing apparatus according to claim 1, wherein the program instructions further cause the processor to:
apply the saturation enhancement process to the color difference image signal using an S-shaped tone curve that makes a high pixel value portion of the color difference image signal higher and makes a low pixel value portion of the color difference image signal lower.

13. The image processing apparatus according to claim 12, wherein
a number of bits in the color-difference-corrected image signal that is generated is less than a number of bits in the color difference image signal input to the processor.

14. An image projection apparatus comprising:
at least one of a field-programmable gate array and an application specific integrated circuit that implements the image processing apparatus according to claim 1.

15. An image processing method comprising:
converting an input image signal of each frame of a moving image signal into a luminance image signal and a color difference image signal;
generating a luminance-corrected image signal by applying a histogram equalization process to the luminance image signal of each frame;
creating a color-difference-corrected image signal by applying a saturation enhancement process to the color difference image signal of each frame; and
converting the luminance-corrected image signal and the color-difference-corrected image signal into an output image signal that is in the same format as the input image signal;
wherein the luminance image correction step and the color difference image correction step are executed in parallel with respect to each frame; and
wherein the luminance image correction step includes adjusting a histogram equalization correction intensity of the histogram equalization process with respect to each frame.

* * * * *